July 29, 1930.  A. NOVICK  1,771,732
ENVELOPE MACHINERY
Filed Sept. 2, 1927  27 Sheets-Sheet 1
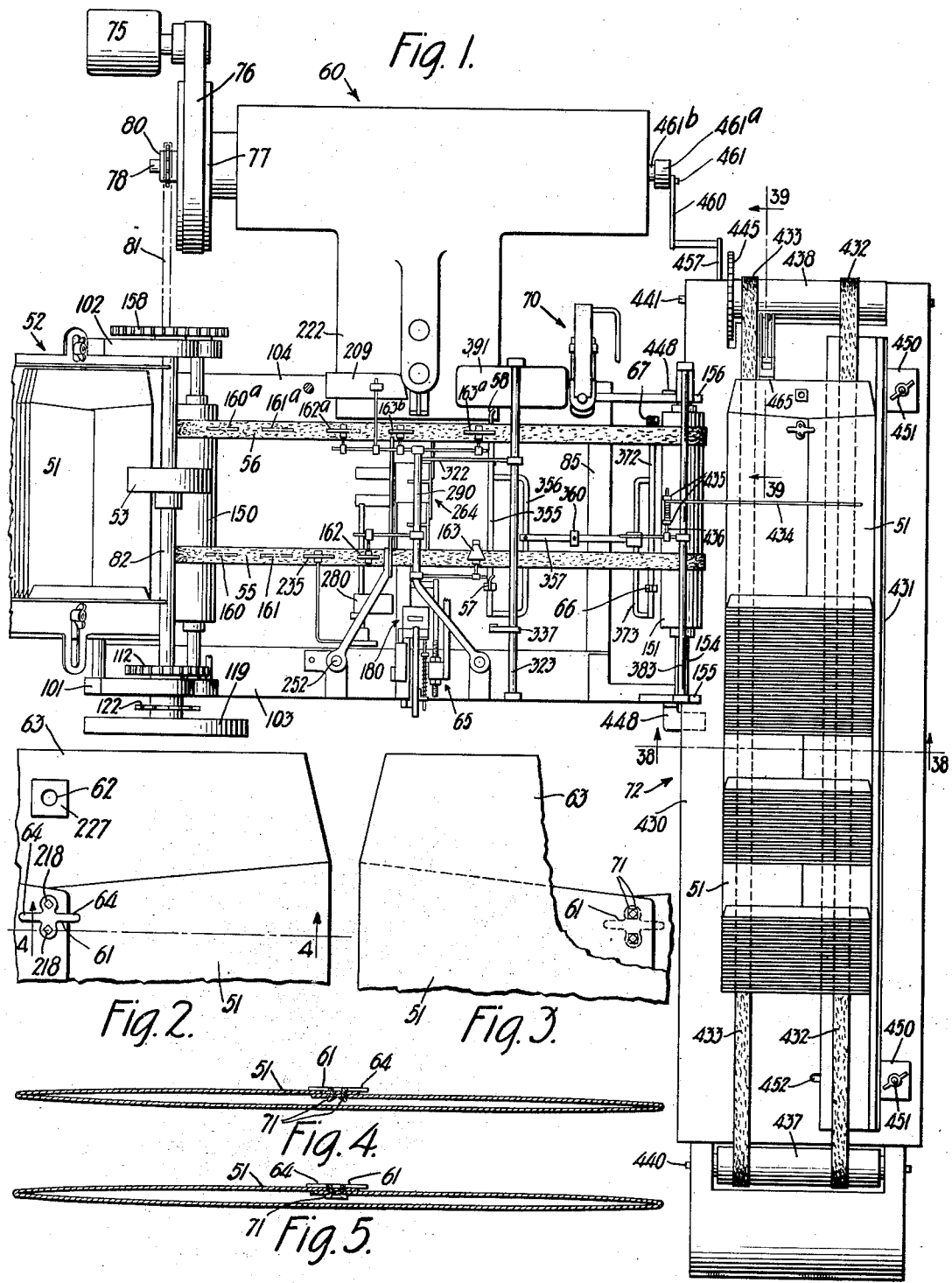

July 29, 1930.  A. NOVICK  1,771,732
ENVELOPE MACHINERY
Filed Sept. 2, 1927   27 Sheets-Sheet 2
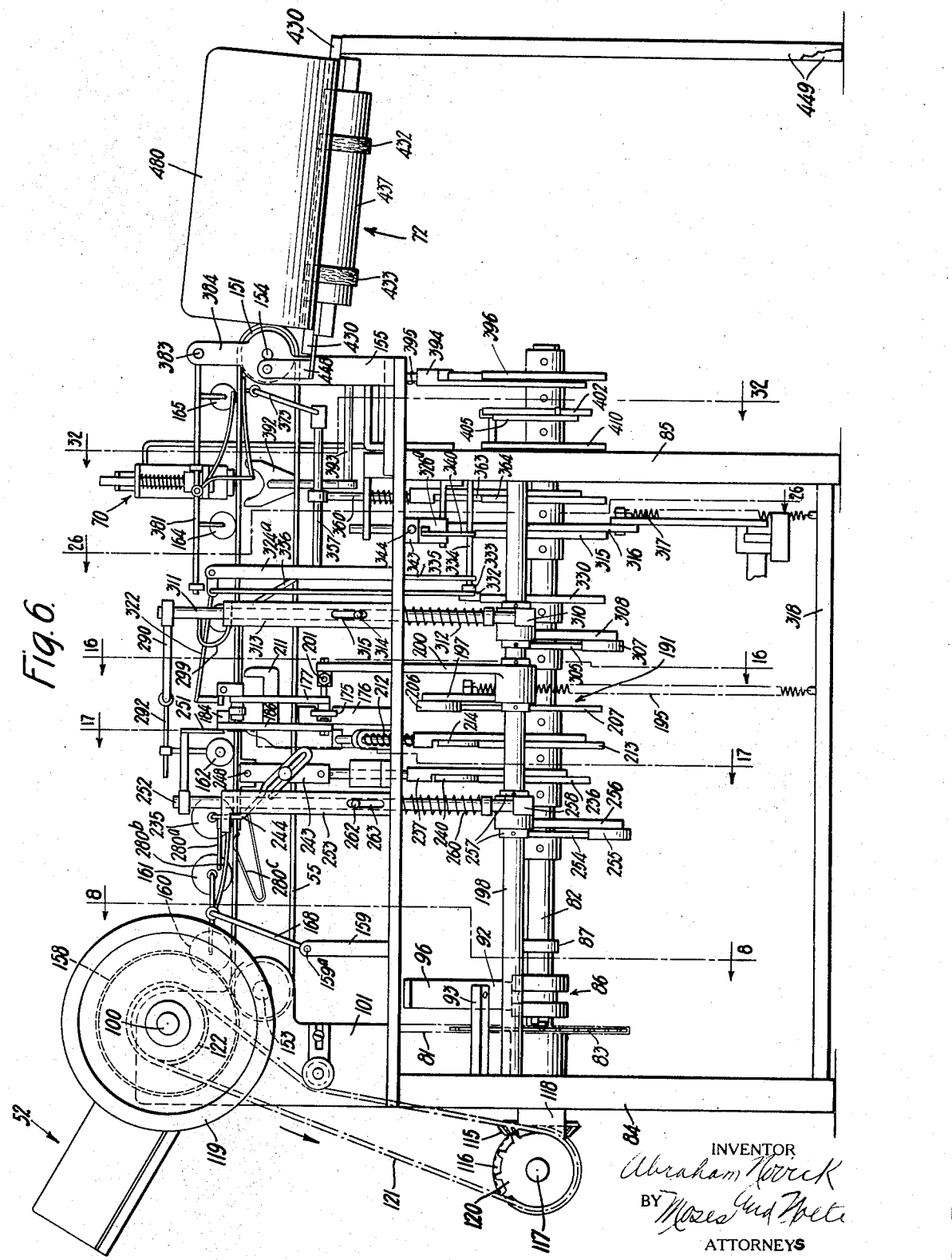

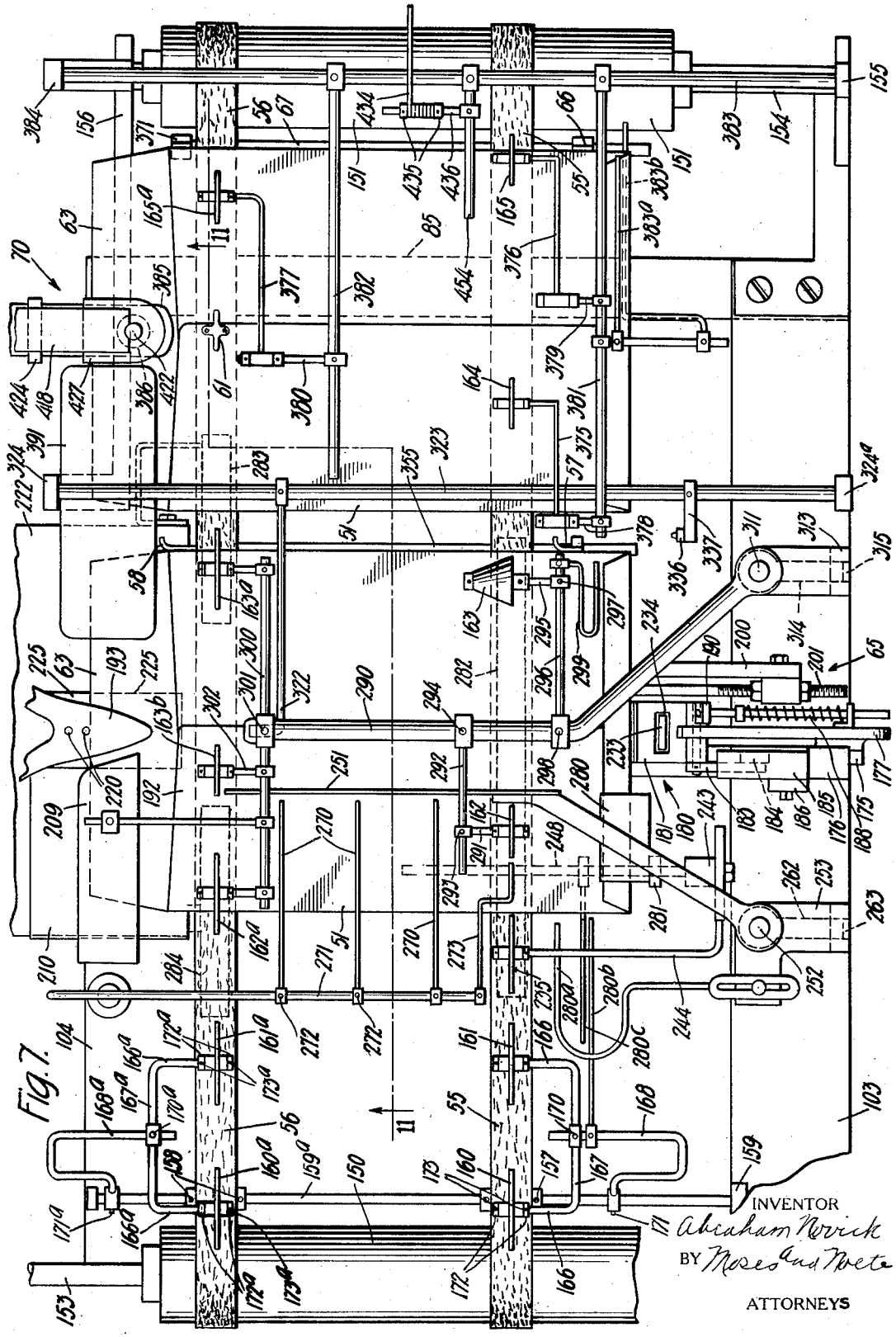

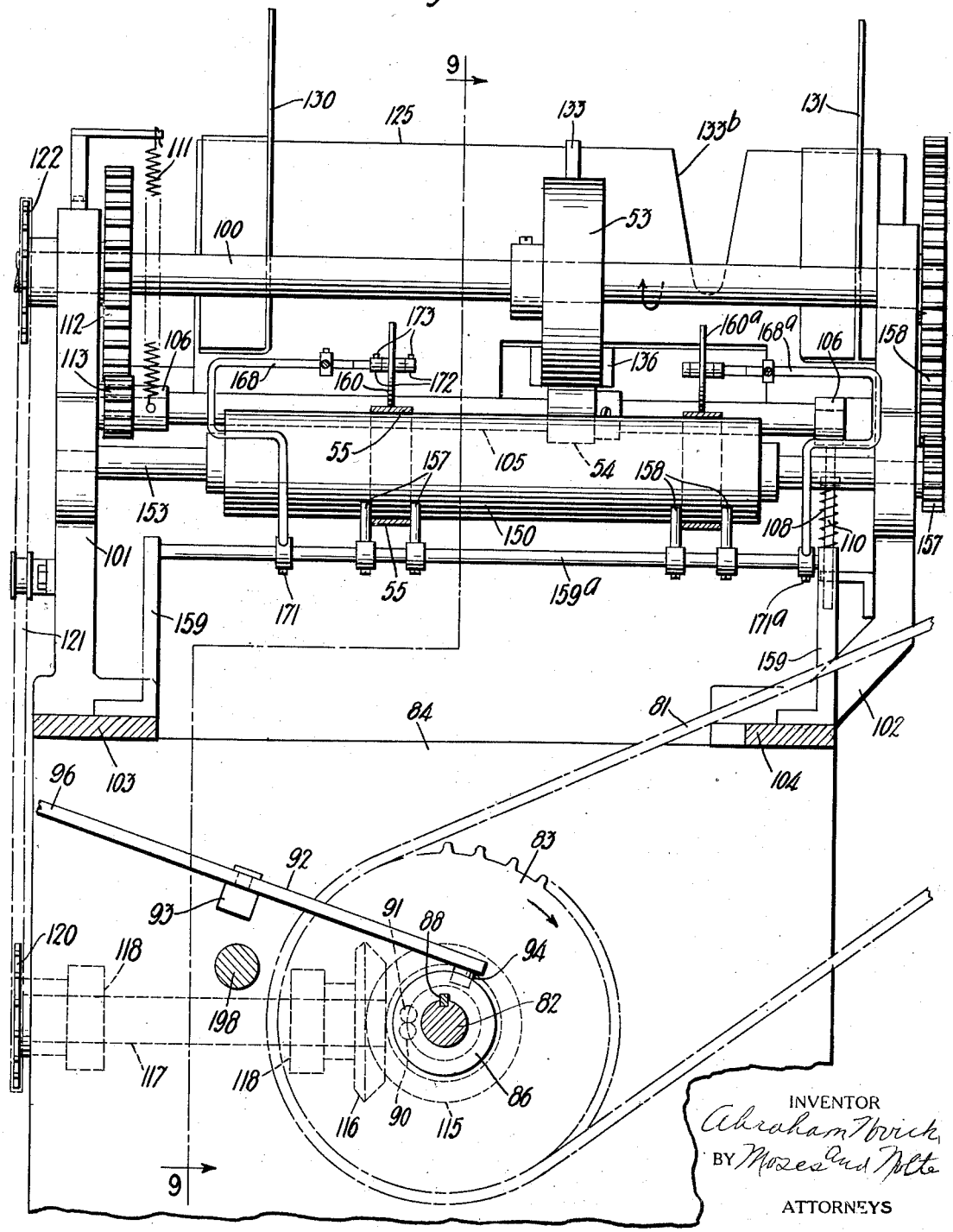

July 29, 1930. A. NOVICK 1,771,732
ENVELOPE MACHINERY
Filed Sept. 2, 1927 27 Sheets-Sheet 5
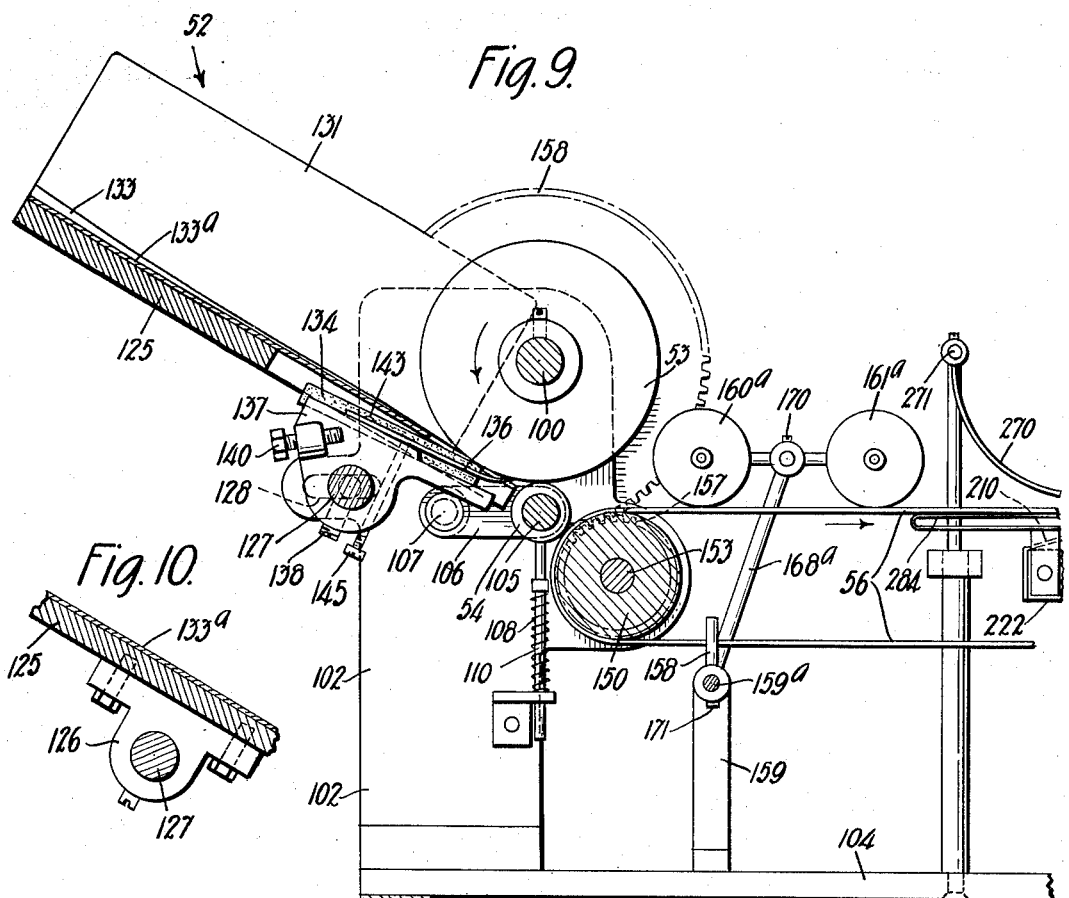
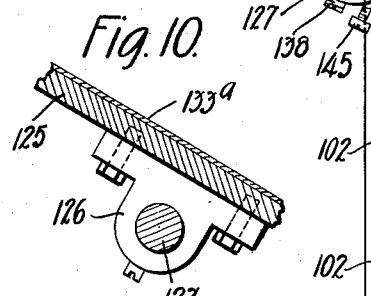
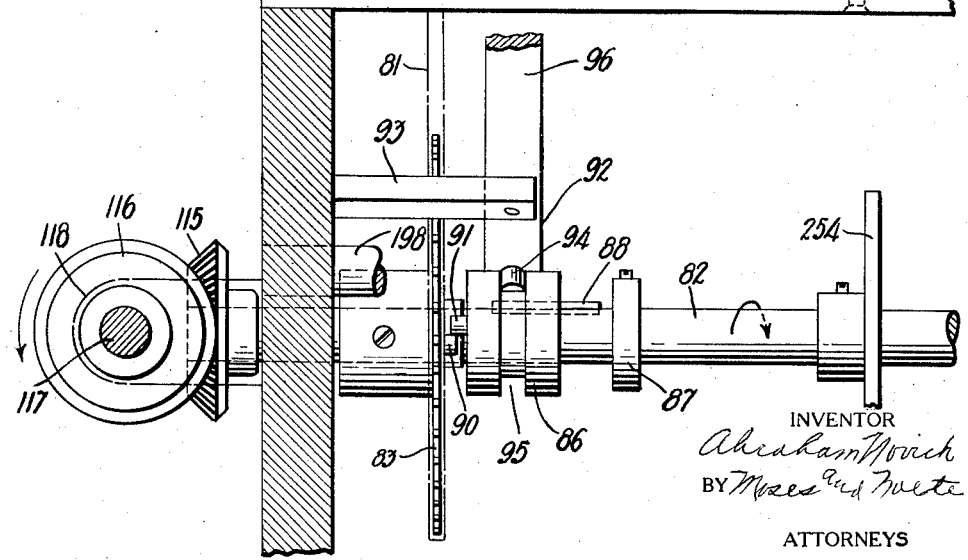
INVENTOR
Abraham Novick
BY Moses and Nolte
ATTORNEYS July 29, 1930.  A. NOVICK  1,771,732
ENVELOPE MACHINERY
Filed Sept. 2, 1927   27 Sheets-Sheet 7
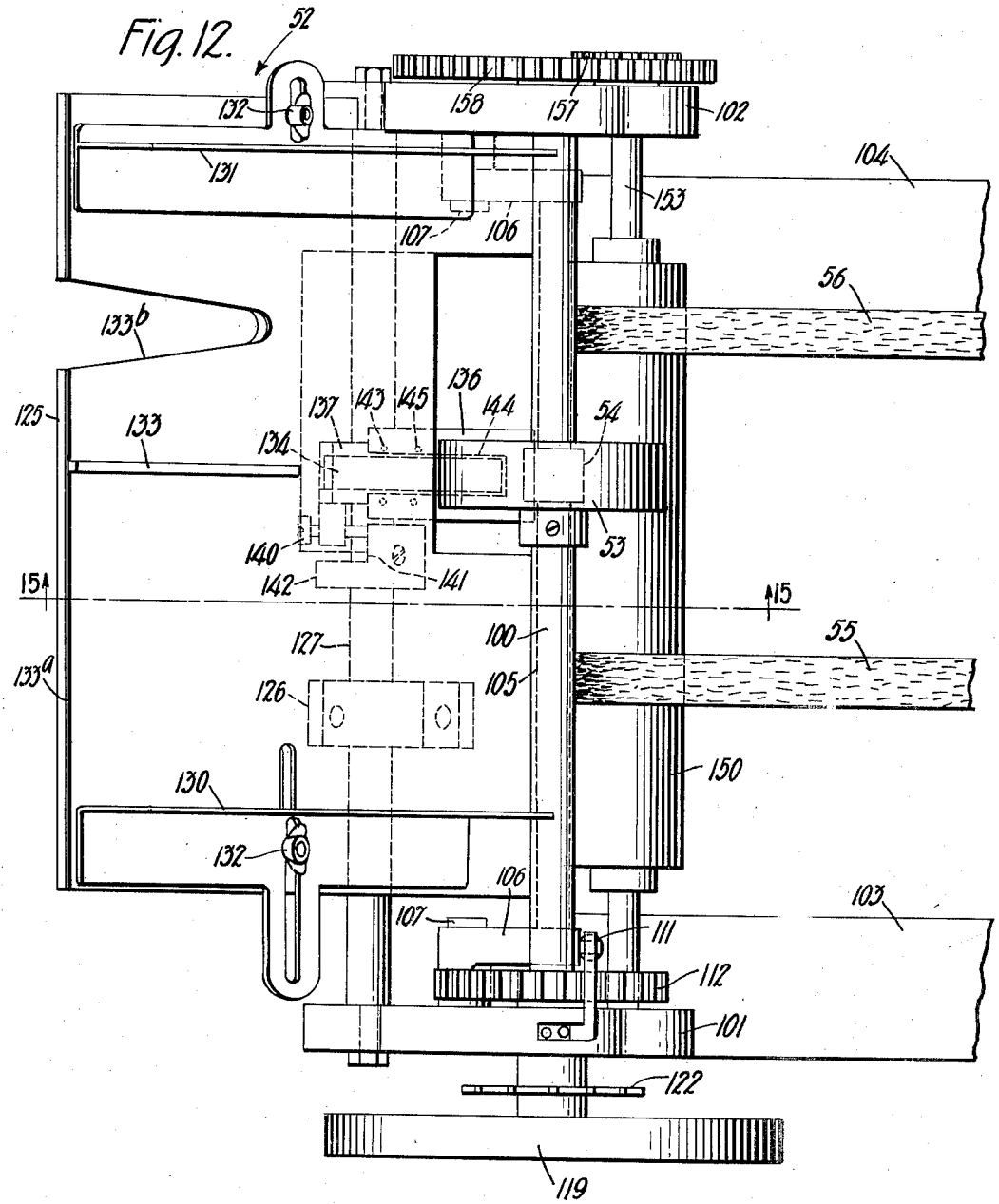
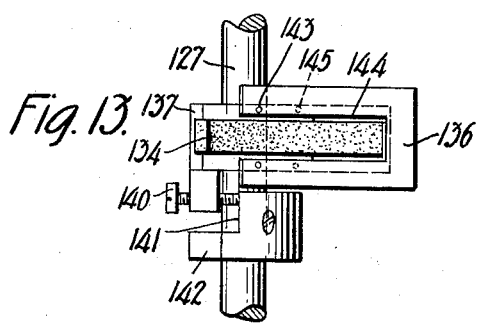
INVENTOR
Abraham Novick
BY Moses and Nolte
ATTORNEYS July 29, 1930.  A. NOVICK  1,771,732
ENVELOPE MACHINERY
Filed Sept. 2, 1927   27 Sheets-Sheet 8

INVENTOR
Abraham Novick
BY
ATTORNEYS

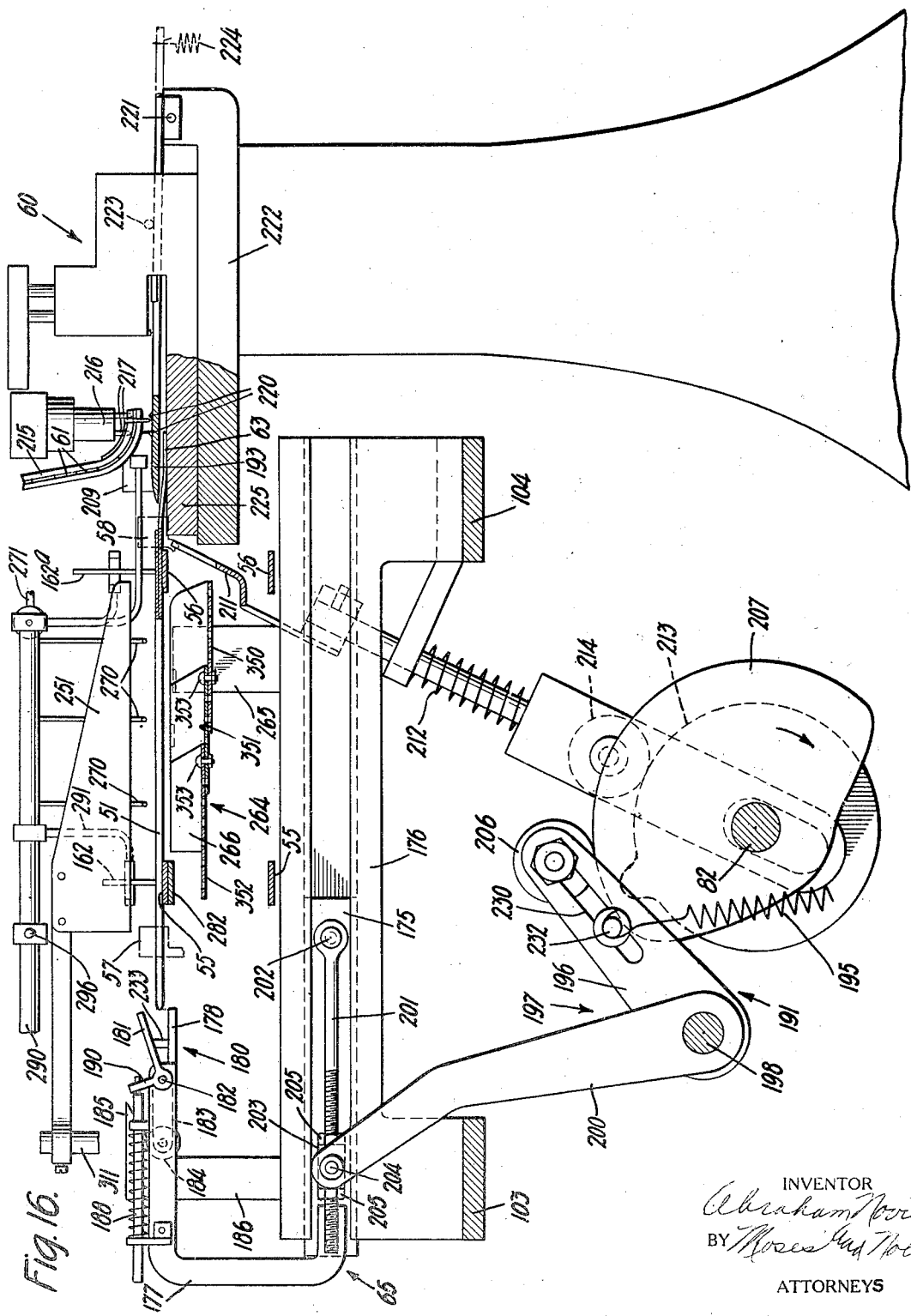

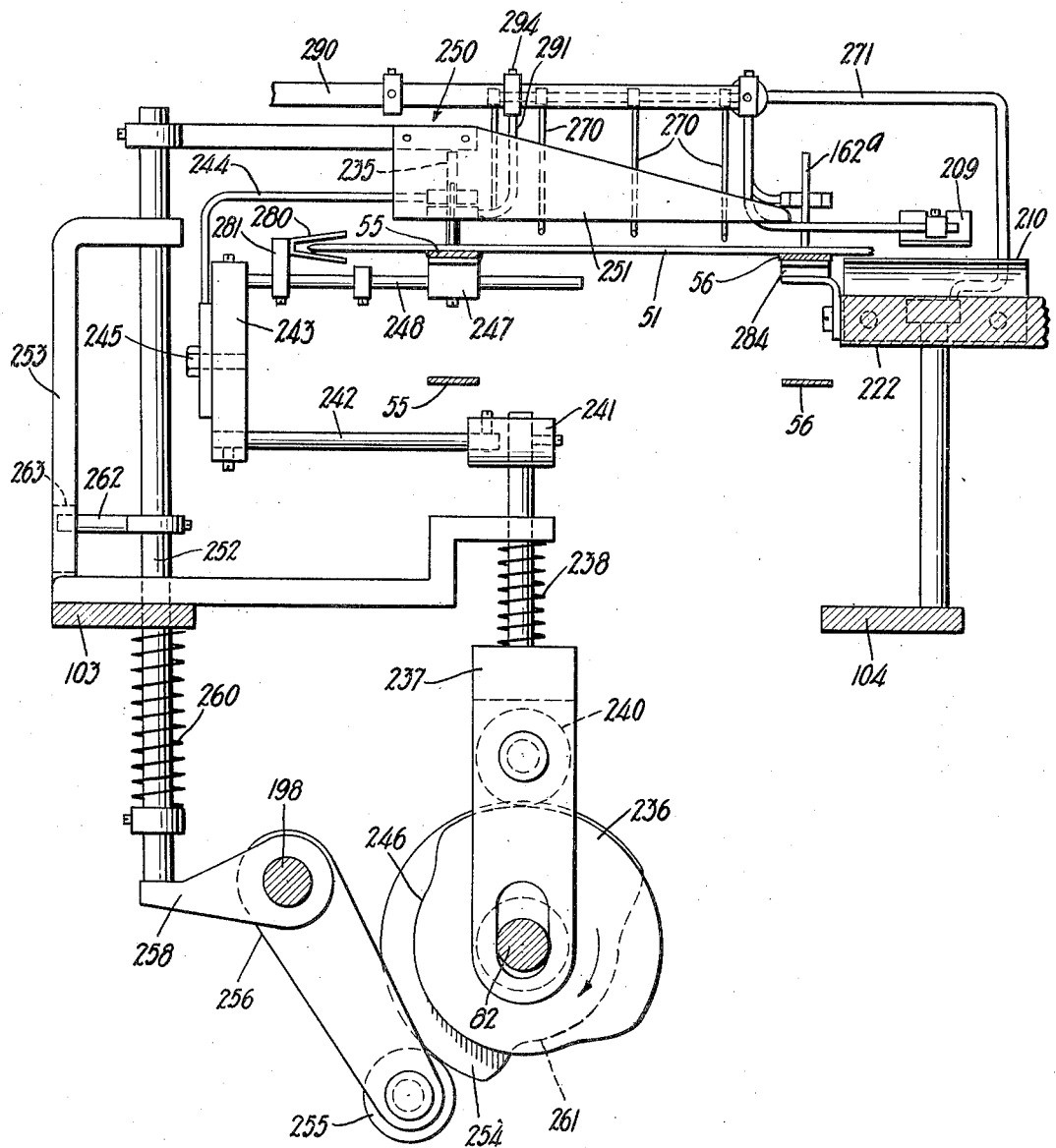

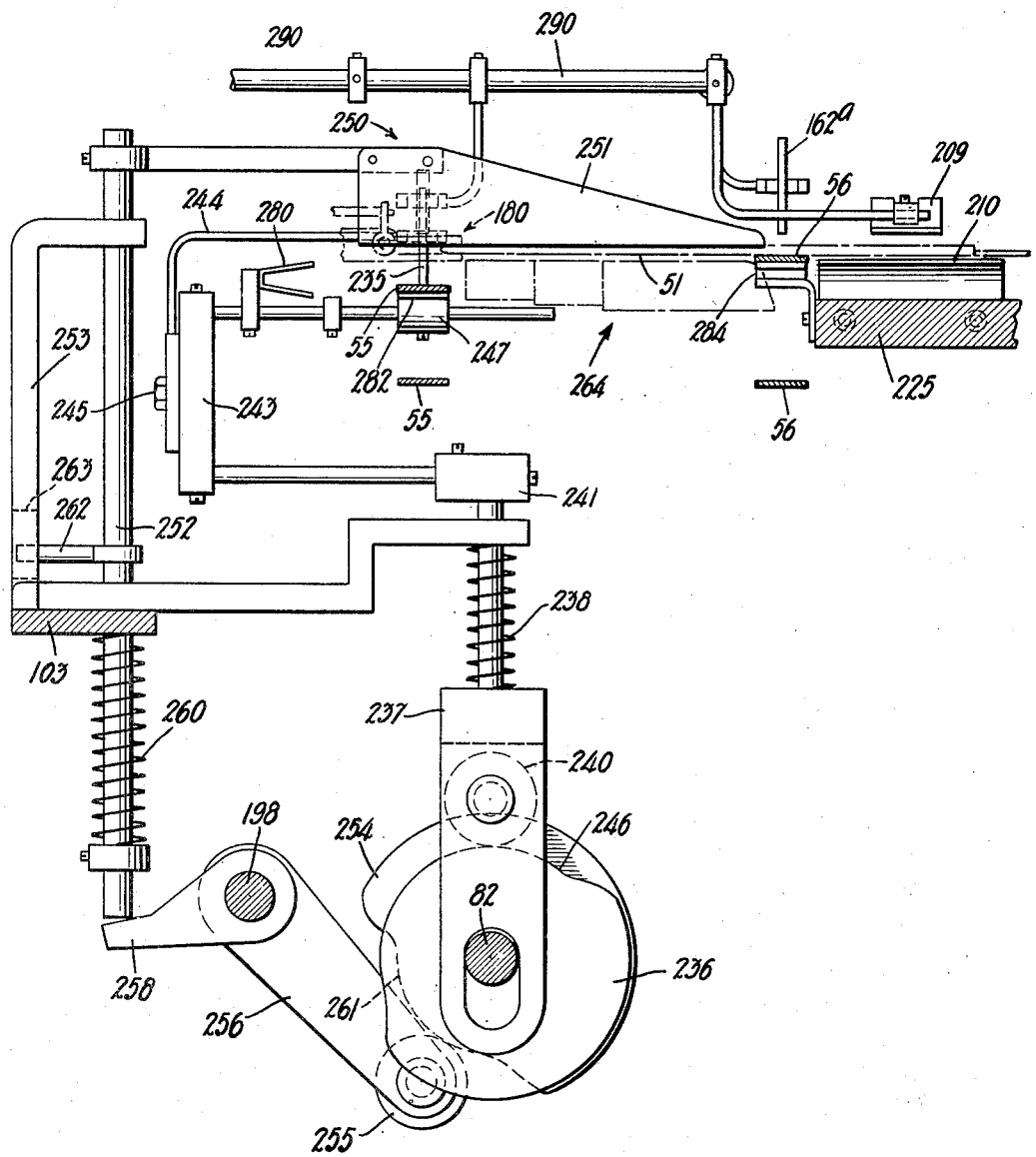

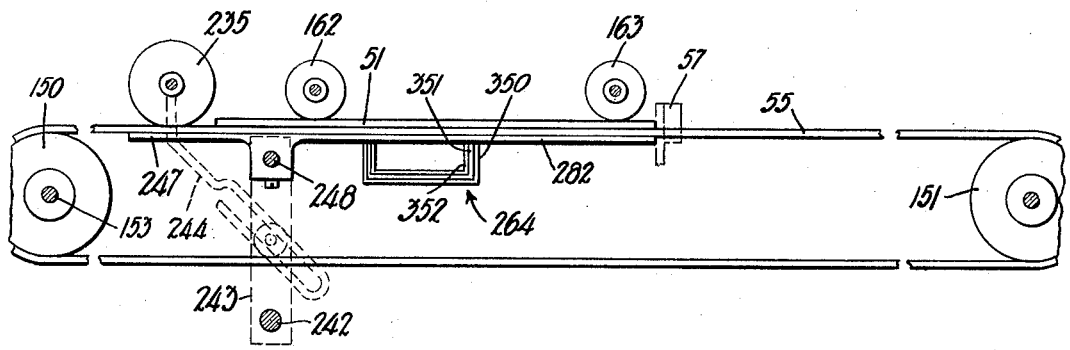
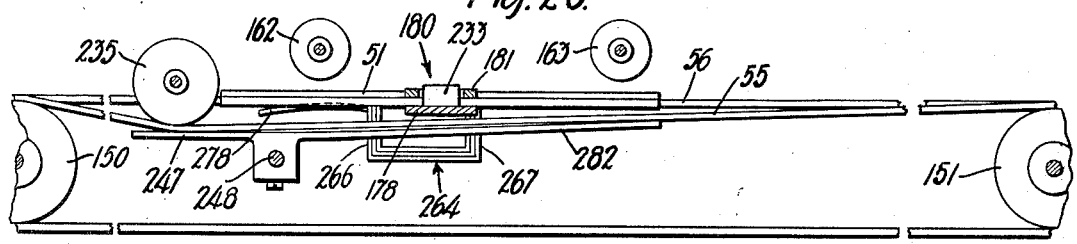
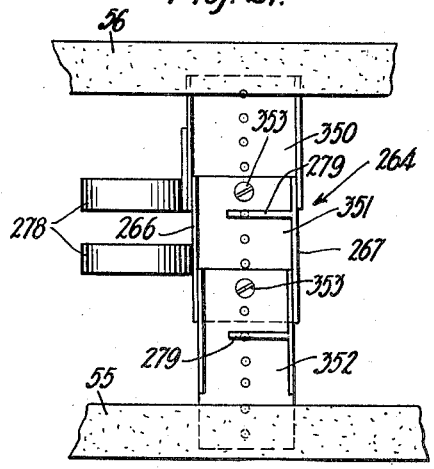

July 29, 1930.　　　　　A. NOVICK　　　　　1,771,732
ENVELOPE MACHINERY
Filed Sept. 2, 1927　　　27 Sheets-Sheet 13
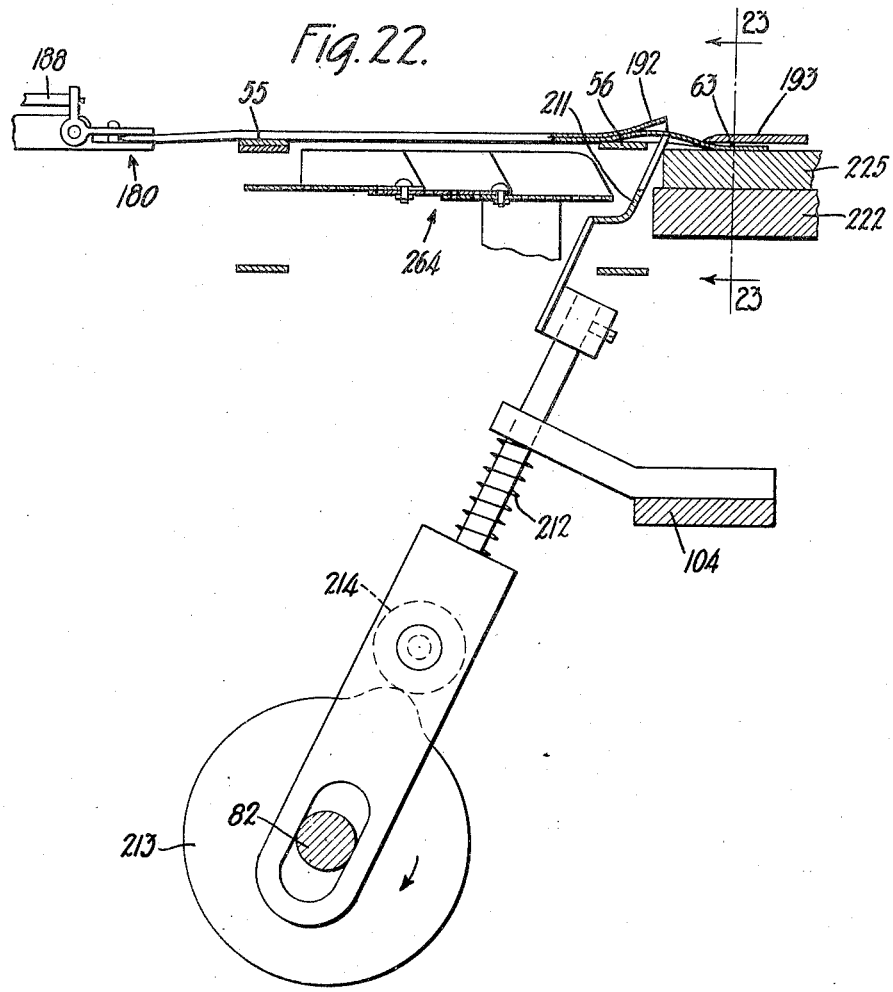
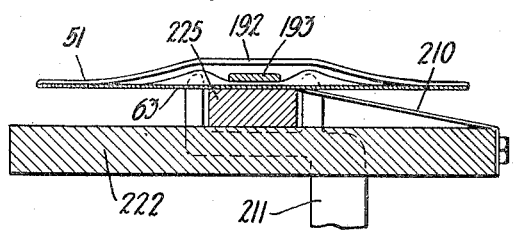
ATTORNEYS

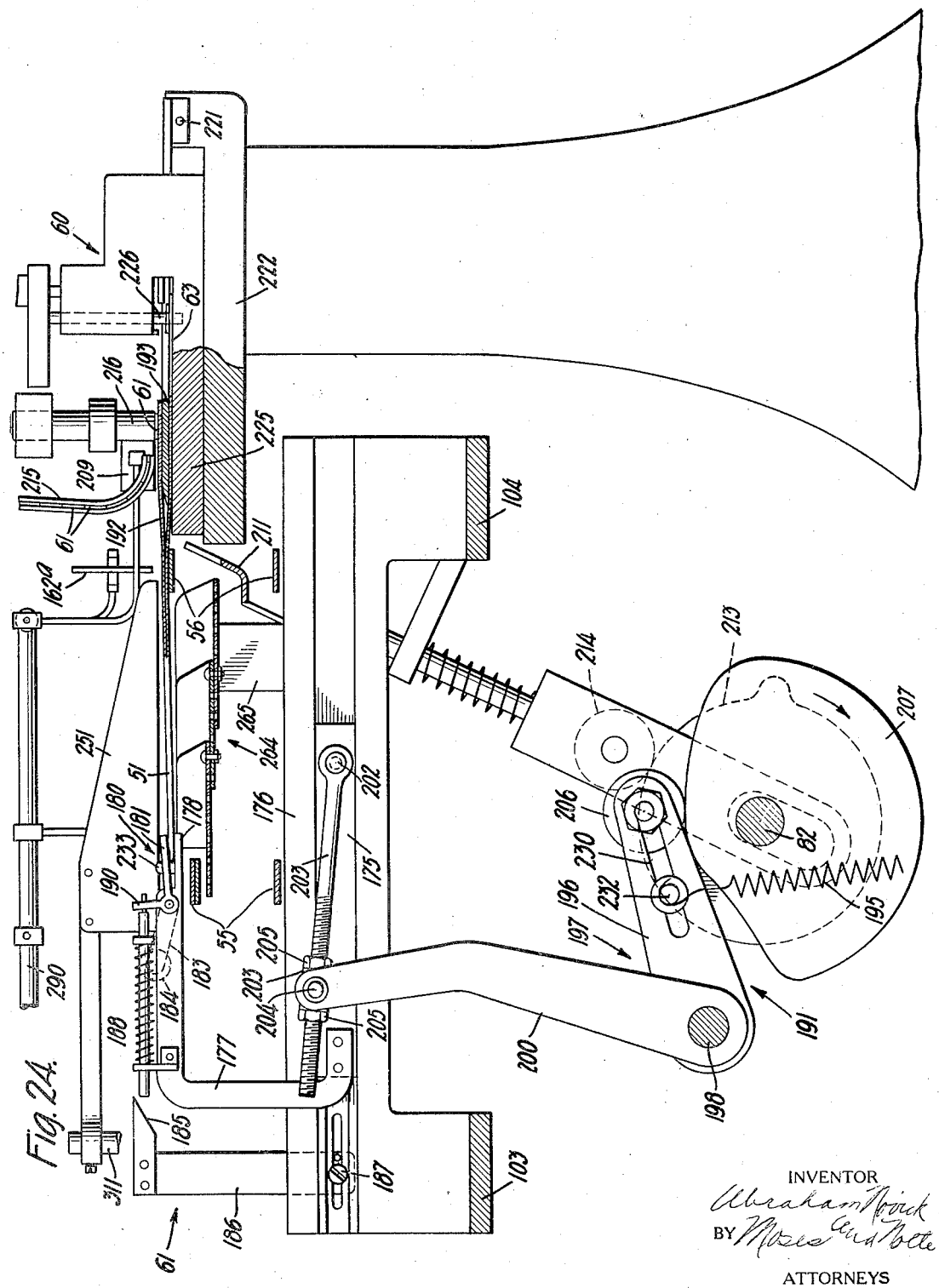

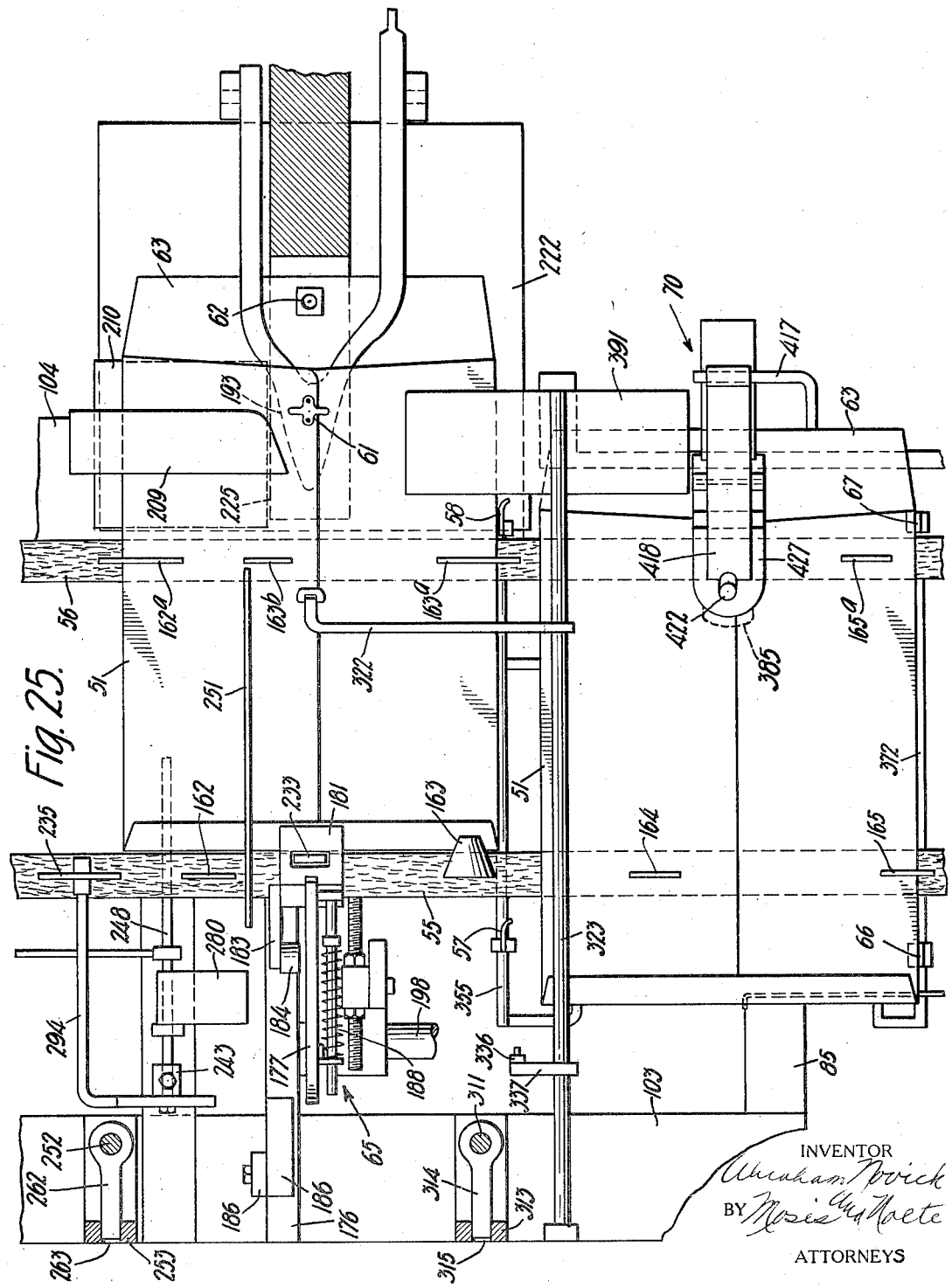

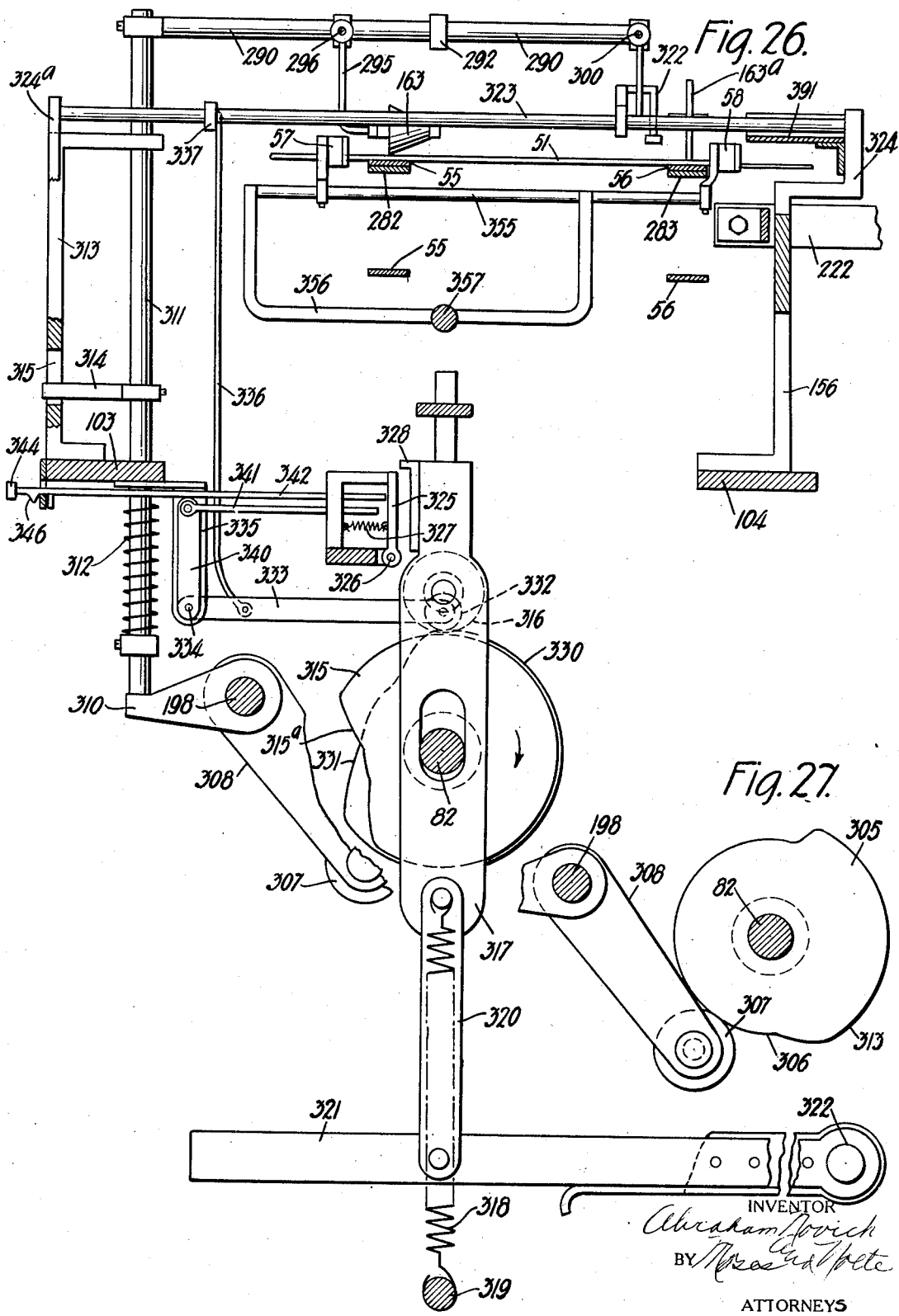

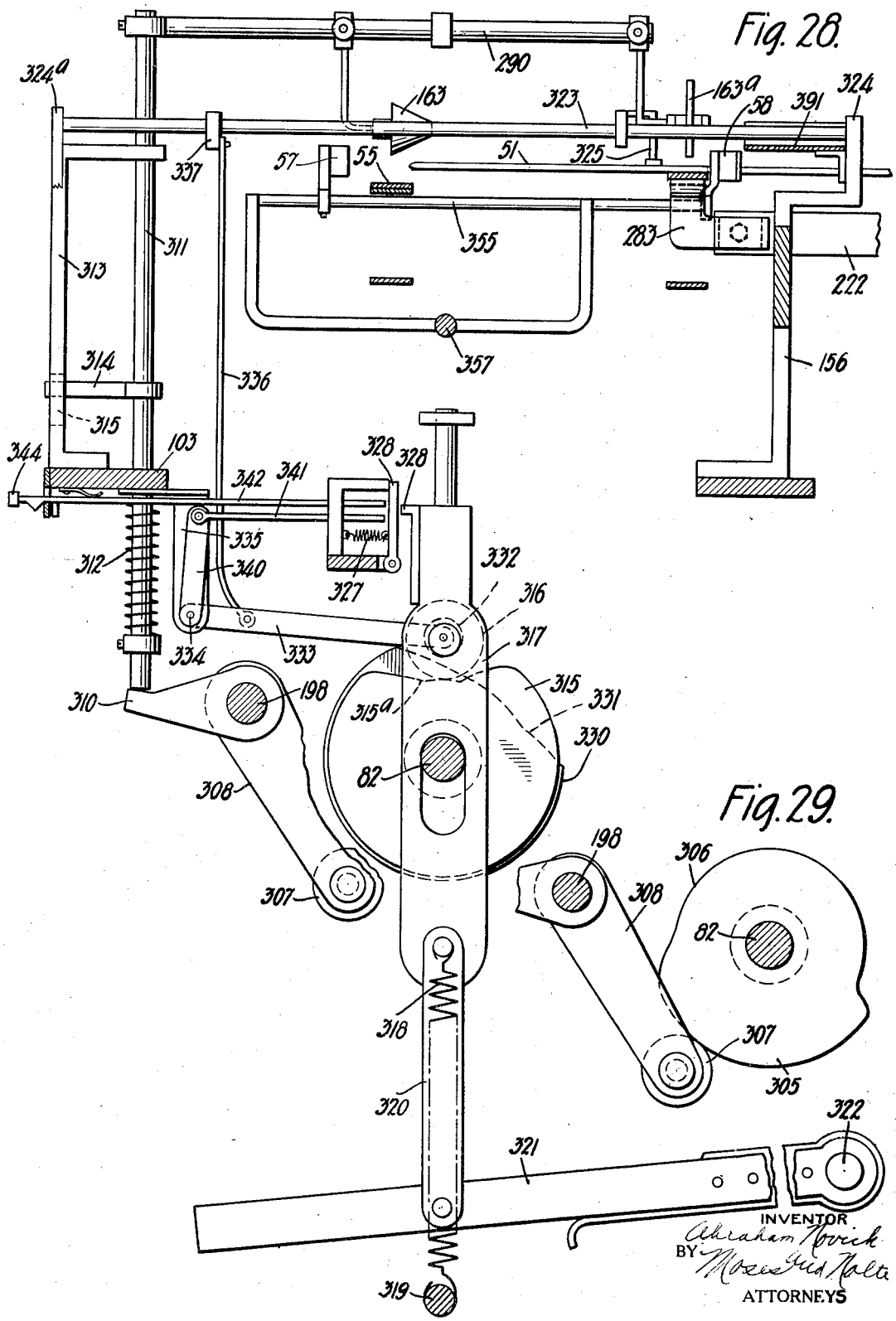

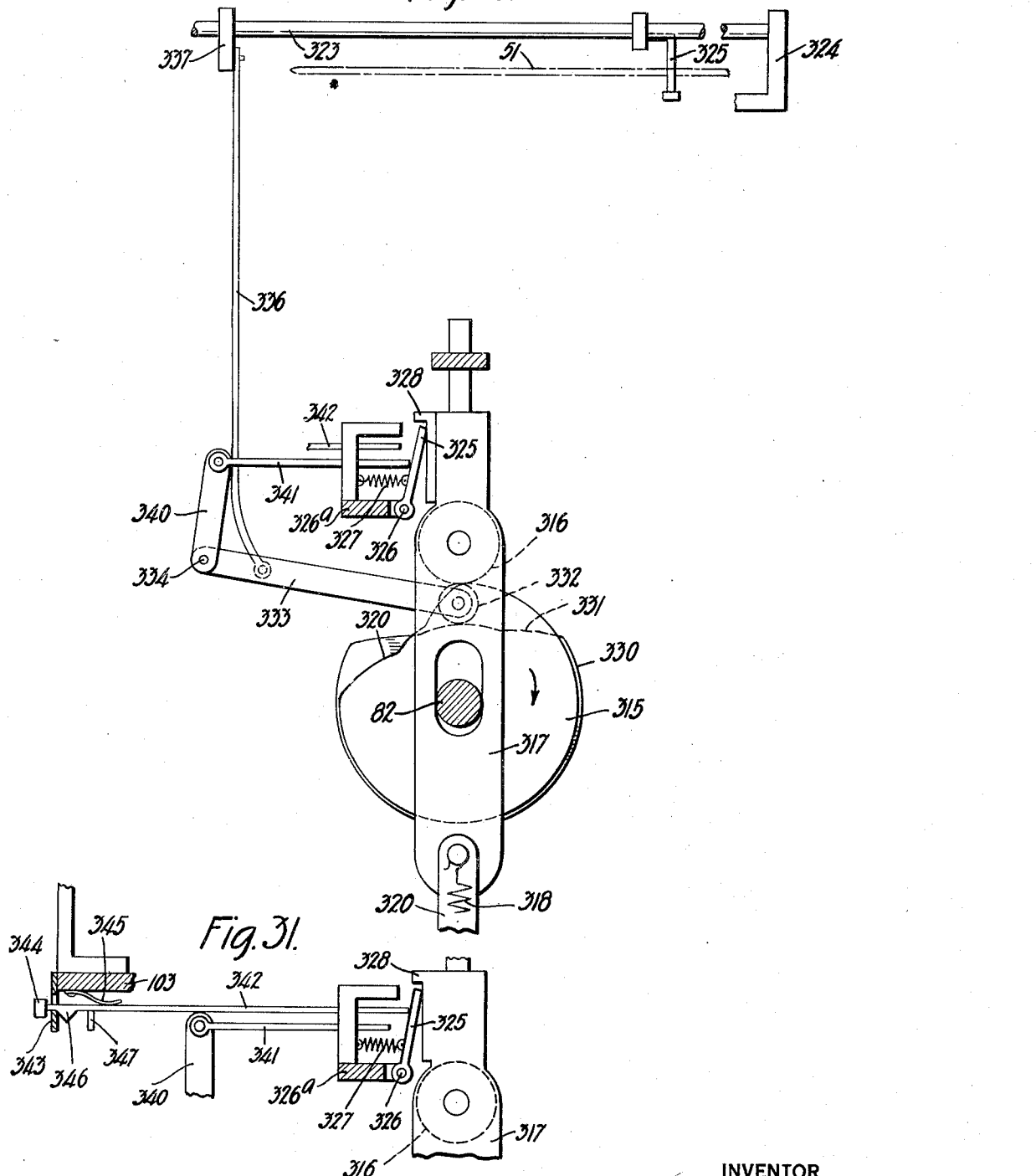

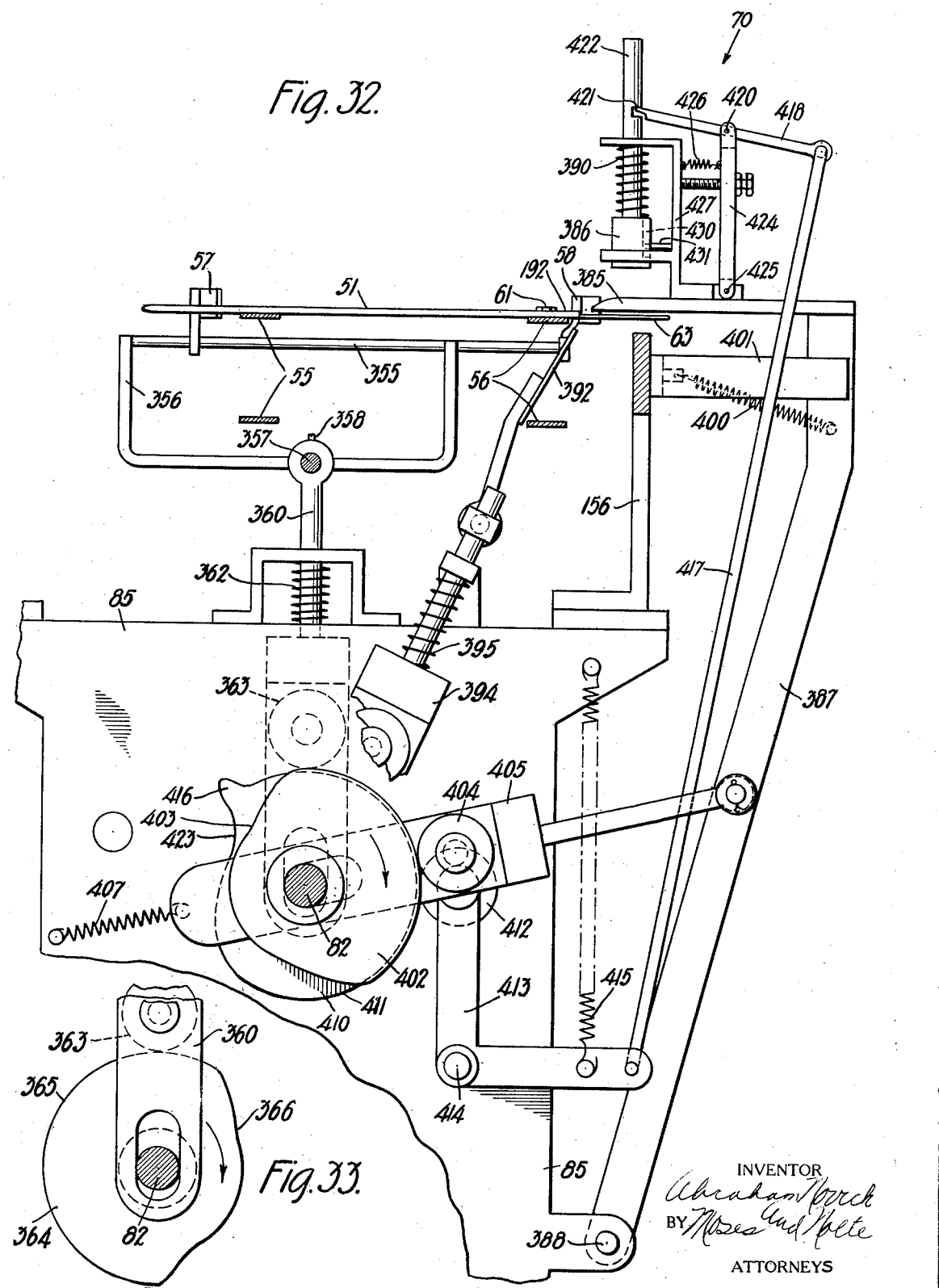

July 29, 1930.　　　　A. NOVICK　　　　1,771,732
ENVELOPE MACHINERY
Filed Sept. 2, 1927　　27 Sheets-Sheet 20
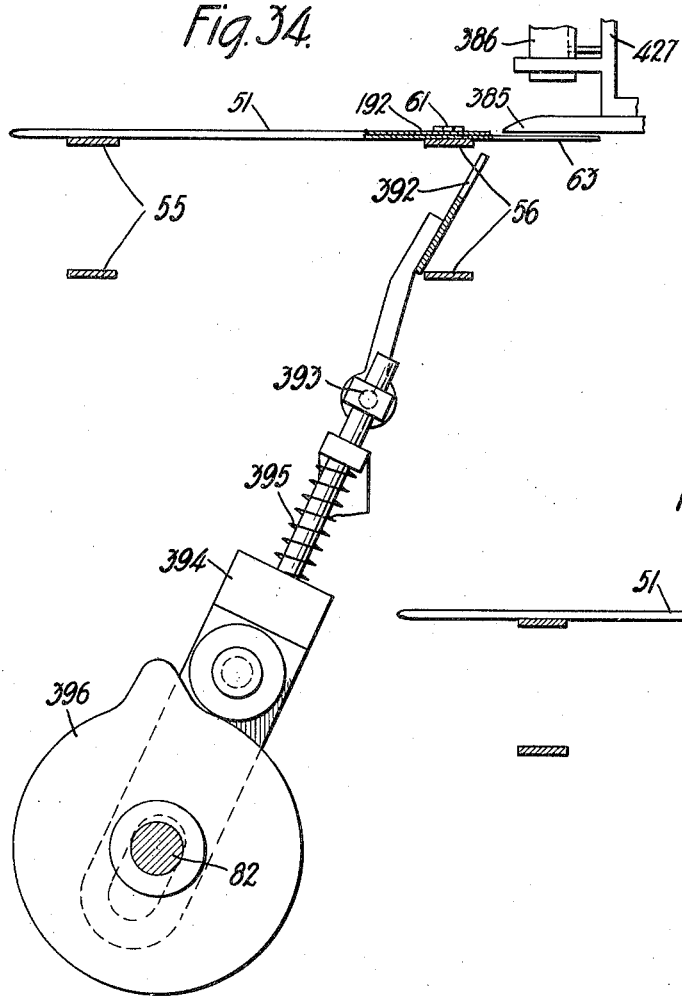
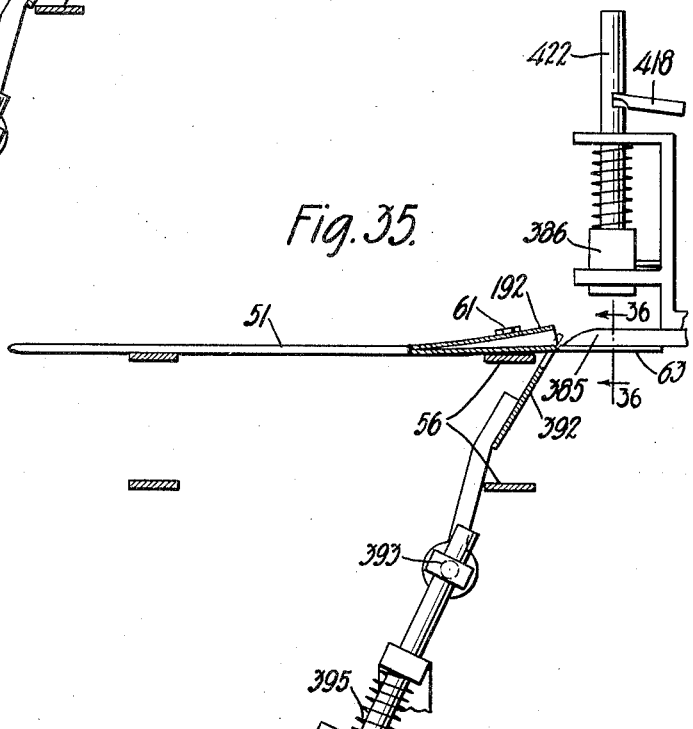
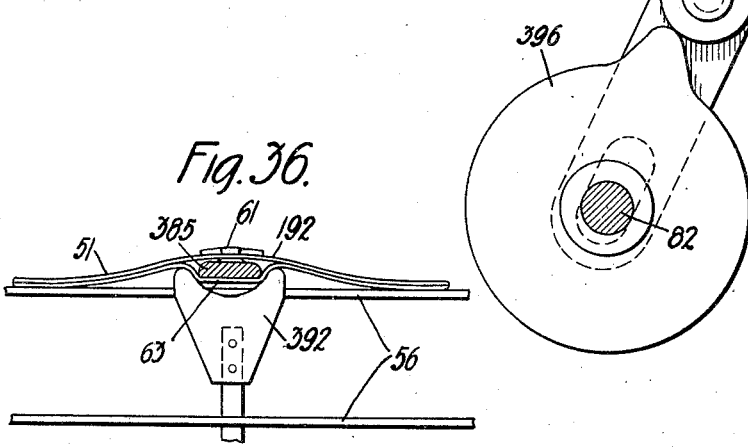
INVENTOR
Abraham Novick
BY
ATTORNEYS

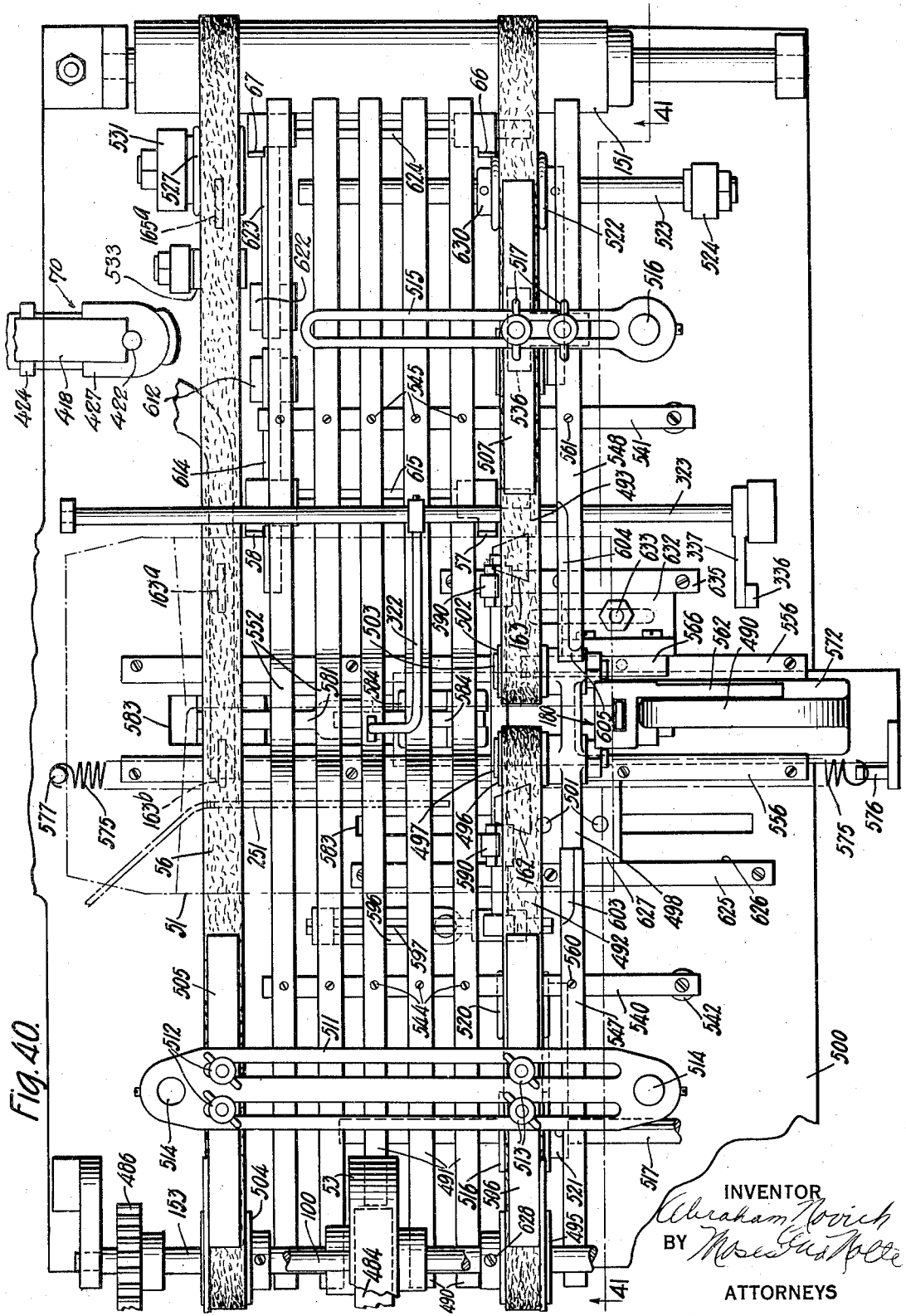

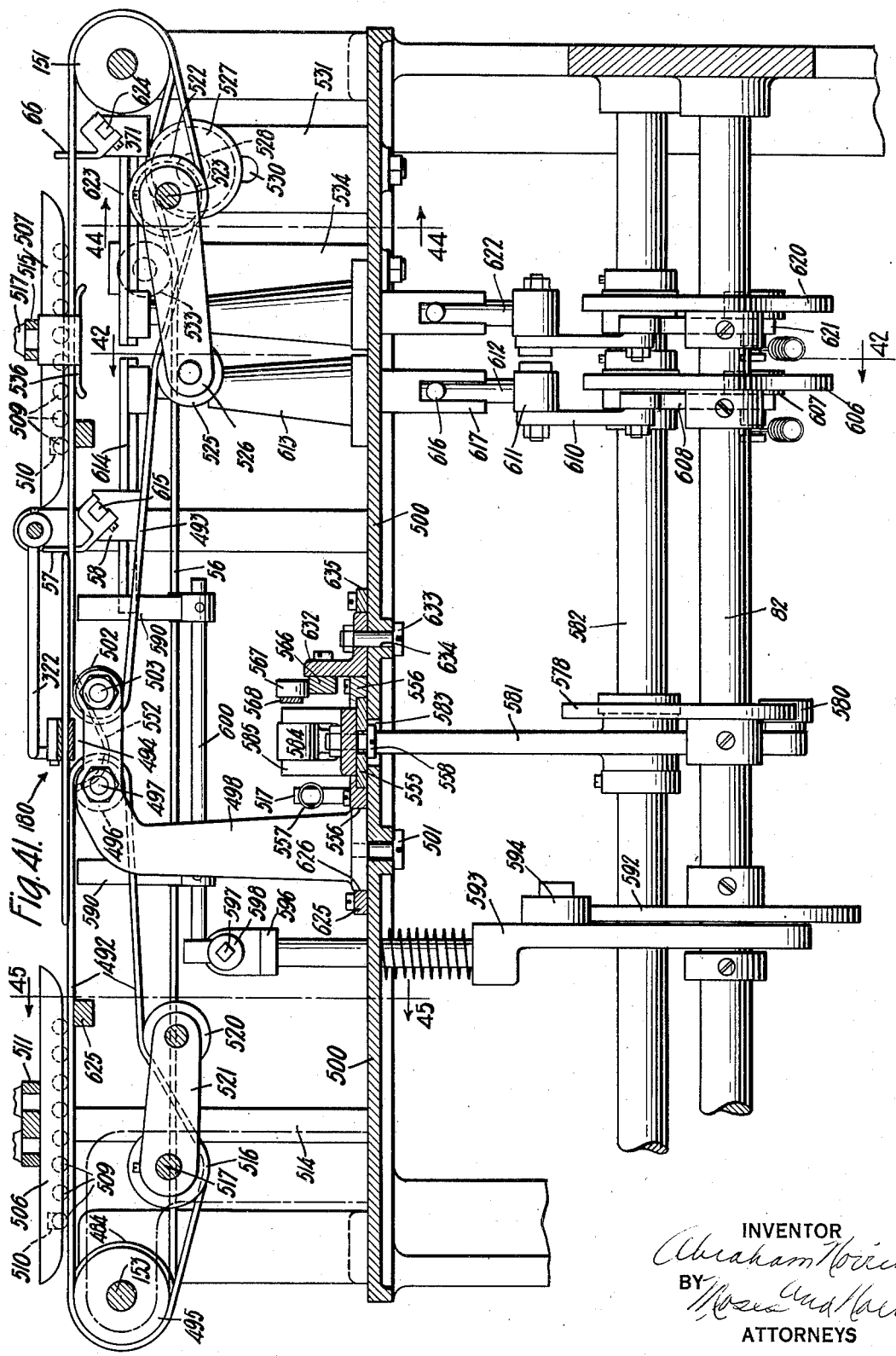

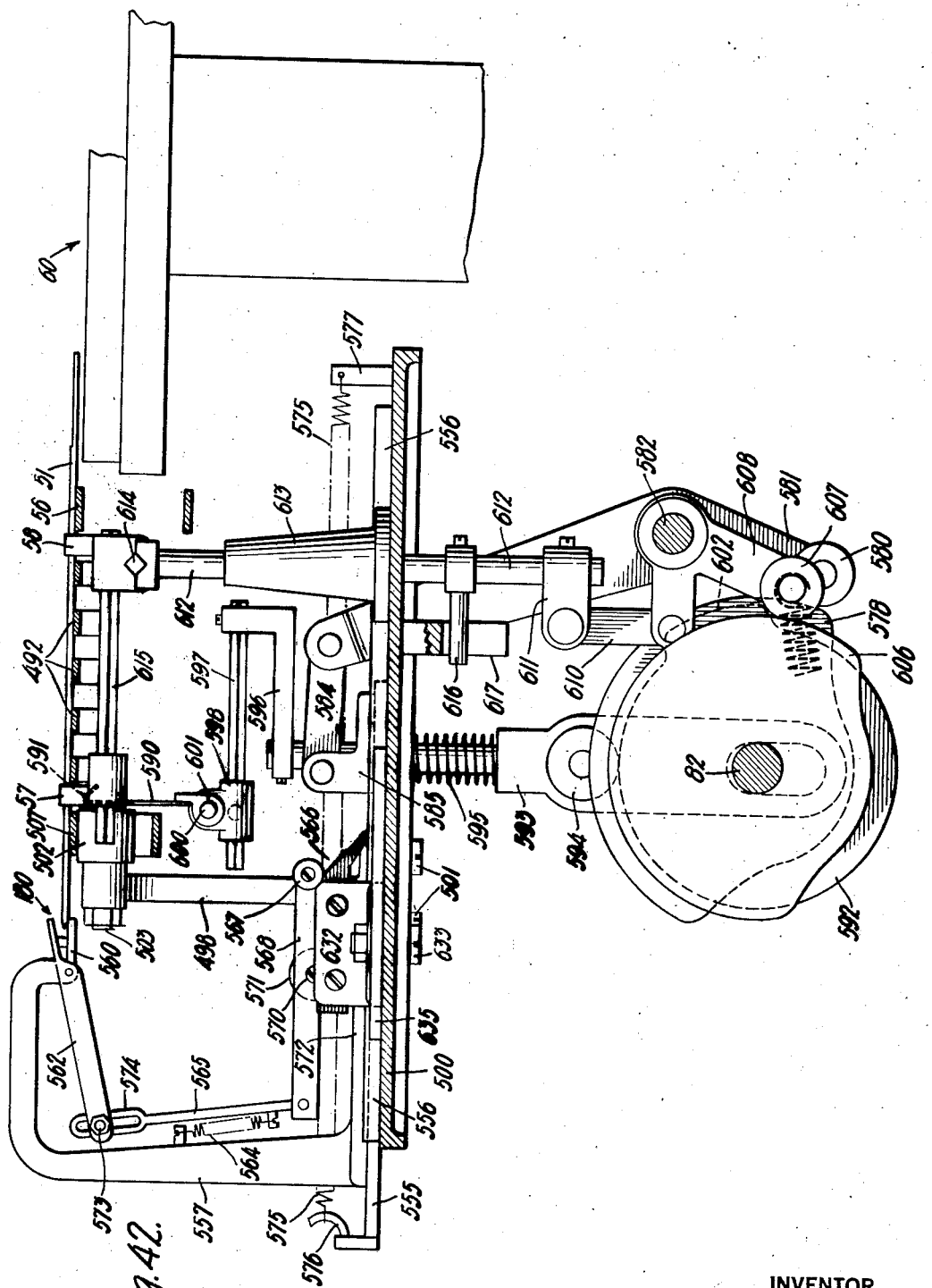

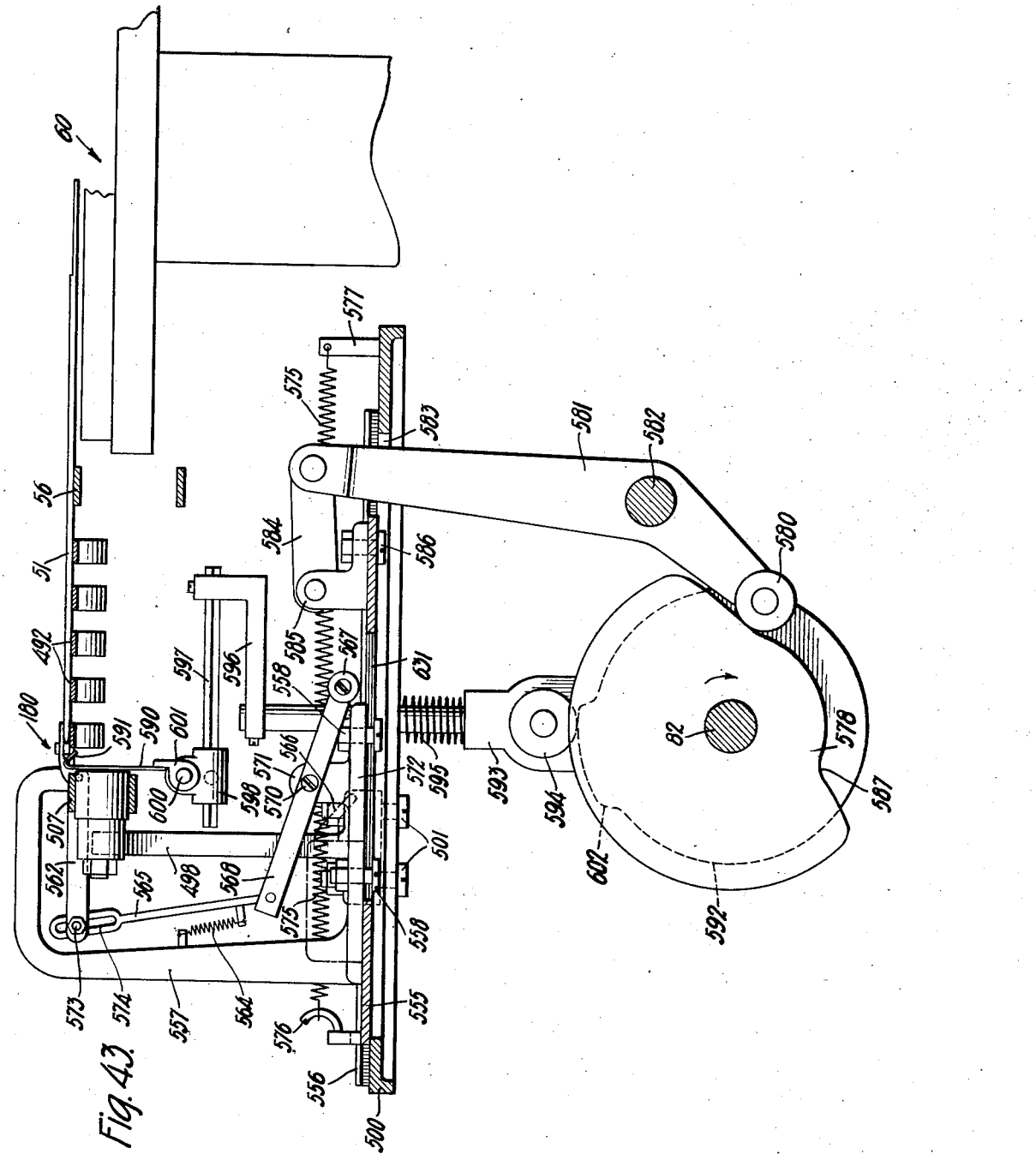

July 29, 1930.  A. NOVICK  1,771,732
ENVELOPE MACHINERY
Filed Sept. 2, 1927  27 Sheets-Sheet 27
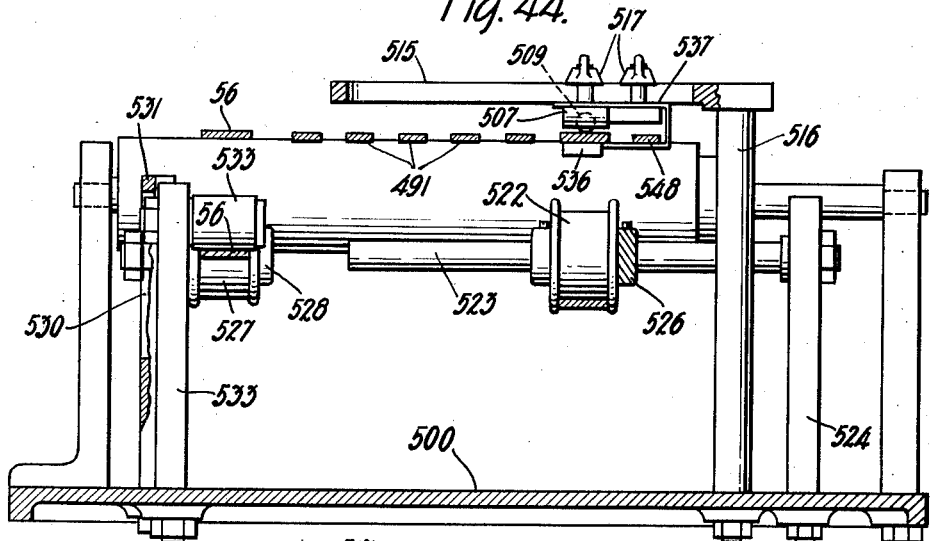
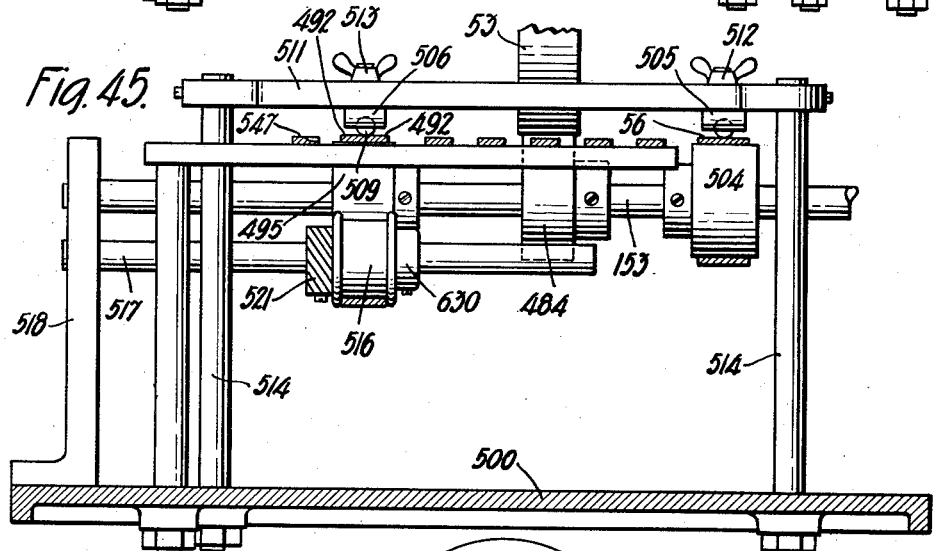
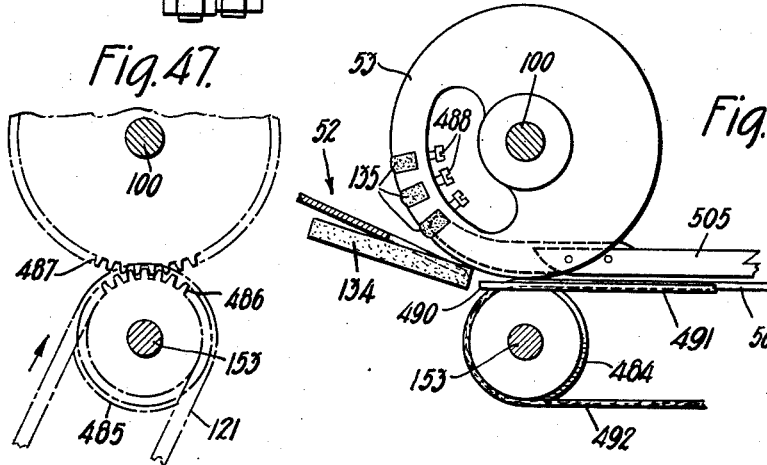
INVENTOR
BY
ATTORNEYS Patented July 29, 1930

1,771,732

UNITED STATES PATENT OFFICE

ABRAHAM NOVICK, OF FLUSHING, NEW YORK, ASSIGNOR TO F. L. SMITHE MACHINE CO., INC., OF NEW YORK, N. Y., A CORPORATION OF NEW YORK

ENVELOPE MACHINERY

Application filed September 2, 1927. Serial No. 217,136.

My present invention relates to machines for inserting fastening or other devices in envelopes and the like. In the preferred embodiment under description, the envelopes are fed from a source of supply, preferably in a direction parallel to the sealing flaps and preferably with said flaps extended, such feeding being continued until a station is reached at which the fastening or other device is to be inserted. It is a feature of the invention that when said station has been reached, the envelope is already partially engaged by the inserting means whereby the blank needs a minimum of movement to feed same into engagement therewith.

The invention also relates to mechanism for stopping the travel of the envelope at this station, aligning same and then moving it into engagement with said inserting means. The invention further contemplates the provision of means for flattening or smoothing off the prongs of the inserted device, and novel means for opening such envelopes and causing an anvil member to be inserted, both for this operation and for that of inserting the said devices above mentioned. It further relates to improved means for preventing operation of the fastening device in case no envelope is presented thereto.

The invention further relates to improved means for receiving the envelopes after the completed operation and to means for dividing same into groups of a definite number.

Further advantages and objects to be attained will be apparent as the description proceeds and the novel features will be particularly pointed out in the appended claims.

My invention will be best understood from the following detailed description taken with the annexed drawings in which:

Figure 1 is a top plan view of an illustrative embodiment thereof;

Figure 2 is a fragmentary view of the envelope showing a fastener attached thereto;

Figure 3 is a view similar to Figure 2 but shows the fastener as seen from the interior of the envelope;

Figure 4 is a sectional view taken on the line 4—4 of Figure 2 and shows the fastener attached to the envelope;

Figure 5 is a view similar to Figure 4 but shows the fastening clasps flattened;

Figure 6 is a front elevation of the machine;

Figure 7 is a top plan view of a portion of Figure 1;

Figure 8 is a vertical section taken on the line 8—8 of Figure 6 and illustrates the envelope feeding mechanism, and also the drive and clutch control to the main shaft of the machine;

Figure 9 is a vertical section taken on the line 9—9 of Figure 8;

Figure 10 is a detailed view showing the support for the hopper from which the envelopes are fed;

Figure 12 is a top plan view of Figure 9 showing the hopper and the envelope feeding means associated therewith;

Figure 13 is a detailed top plan view illustrating a rubber pad located in the bottom of the hopper to prevent more than one envelope being fed from the hopper at a time;

Figure 16 is a vertical section taken on the line 16—16 of Figure 6 and shows the means for transferring the envelopes from the belt conveyors to the fastener or clasp attaching mechanism;

Figure 17 is a vertical section taken on the line 17—17 of Figure 6 and shows chiefly the anti-buckling means for the envelope, and the means for depressing one of the conveyor belts to prevent interference with the envelope transfer means when the latter is operated;

Figure 18 is a view similar to Figure 17 but shows the anti-buckling means and the belt depressing means in operative position;

Figure 19 is a detail front view of the belt conveyor and some of the depressing means, the parts being in their inoperative positions and corresponding to the position of parts in Figure 17;

Figure 20 is a view similar to Figure 19, the parts being in operative position as in Figure 18;

Figure 21 is a top plan view of a guide to support the envelope after the conveyor belt has been depressed;

Figure 22 is a sectional side view illustrating lifter of Figure 16 after it has been operated to open the unsealed end of the envelope preparatory to the entrance of an anvil of the clasp attaching mechanism into the envelope upon the transverse movement of the envelope to the clasp attaching mechanism;

Figure 23 is a detailed sectional view taken on the line 23—23 of Figure 22 illustrating the operation of the lifter;

Figure 24 is a sectional side view similar to Figure 16 showing the envelope transferred to the fastener attaching mechanism and the punches of said mechanism operated;

Figure 25 is a fragmentary top plan view of the machine showing the parts in positions corresponding to Figure 24;

Figure 26 is a vertical section taken on the line 26—26 of Figure 6 and shows the means for raising the guide rollers which co-operate with the conveyor belts, and also shows the feeler controlled means which determines whether or not the clutch lever of the fastener attaching mechanism shall be operated;

Figure 27 is a detail view of the cam and follower of the feed roller raising means shown in Figure 26;

Figure 28 is a view similar to Figure 26 but shows the feed rollers raised, the feeler obstructed by an envelope, and the resultant operation of the clutch lever of the clasp attaching mechanism;

Figure 29 is a view similar to Figure 27 and shows the relation of cam and follower corresponding to the position of parts in Figure 28;

Figure 30 is a view similar to Figure 26 but shows the feeler operated in the absence of an envelope opposite the clasp attaching mechanism, and the resultant locking of the means which operates the clutch lever of the clasp attaching mechanism;

Figure 31 is a detail view illustrating the manual control of the lock for the means which operates the clutch lever;

Figure 32 is a vertical section taken on the line 32—32 of Figure 6 and shows the means for removing the aligning stops from the path of the envelopes, the means for flattening the rivet of the fastener or clasp, and the lifter which opens the envelope to facilitate entrance of the anvil of the flattening means;

Figure 33 is a detail view of the cam and follower of the means for actuating the aligning stops shown in Figure 32;

Figure 34 is a detail view of the lifter associated with the riveting means and shows the actuating cam before operating the lifter;

Figure 35 is a view similar to Figure 34 but shows the lifter operated to open the end of the envelope;

Figure 36 is a detail sectional view taken on the line 36—36 of Figure 34;

Figure 40 is a top plan view of another form of the machine;

Figure 41 is a vertical section taken on the line 41—41 of Figure 40;

Figure 42 is a vertical section taken on the line 42—42 of Figure 41 some of the parts being omitted;

Figure 43 is a view similar to Figure 42 and shows the parts operated;

Figure 44 is a vertical section taken on the line 44—44 of Figure 41;

Figure 45 is a vertical section taken on the line 45—45 of Figure 41;

Figure 46 is a detail view of another form of feed for the envelopes from the hopper; and Figure 47 is a detail view of the gear drive for the feed rollers of Figure 46 and the belt conveyors.

Figure 11:
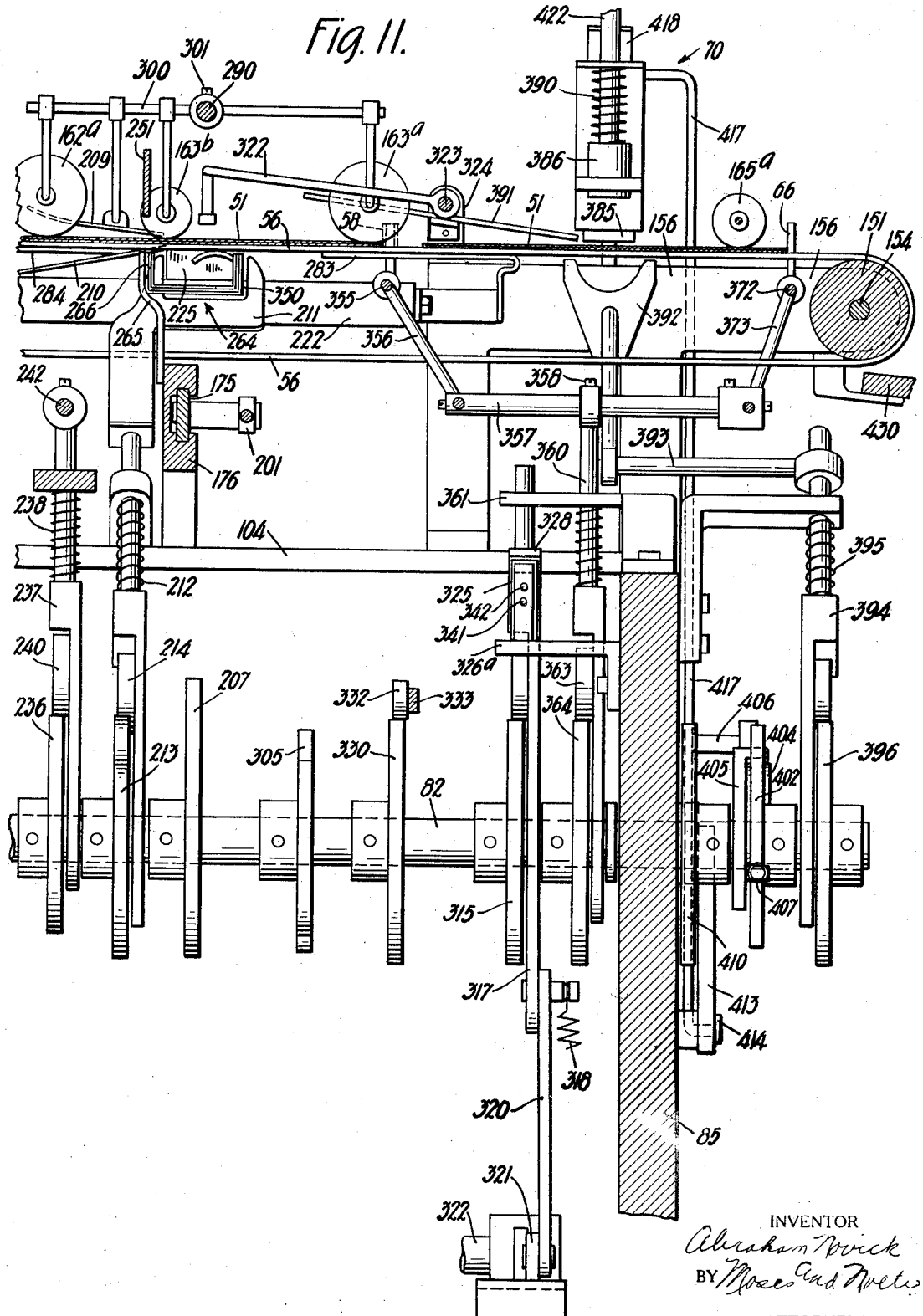
Figure 11 is a vertical section taken on the line 11—11 of Figure 7 and is a continuation of Figure 9.

A brief description of the machine will first be given which will be followed by a detailed description thereof and its operation. Envelopes 51 are piled in a hopper 52 from which they are fed sidewise by feed rollers 53 and 54 to conveyor belts 55, 56 (Figures 1, 7 and 12). The conveyor belts 55, 56 carry the envelopes 51 to aligning means including stops 57, 58 to align the envelopes with clasp attaching mechanism or press 60 (Figures 1 and 16), which may be like that disclosed in the patent to Novick, No. 1,508,467, dated September 16, 1924, and by which a clasp or fastener 61 (Figures 2 and 4) is attached to each envelope. The press 60 also forms a perforation 62 in the closure flap 63 of the envelope (Figure 2) through which the prongs 64 of the fastener 61 may be passed, in the well known manner, to hold the closure flap shut.

Figure 14:
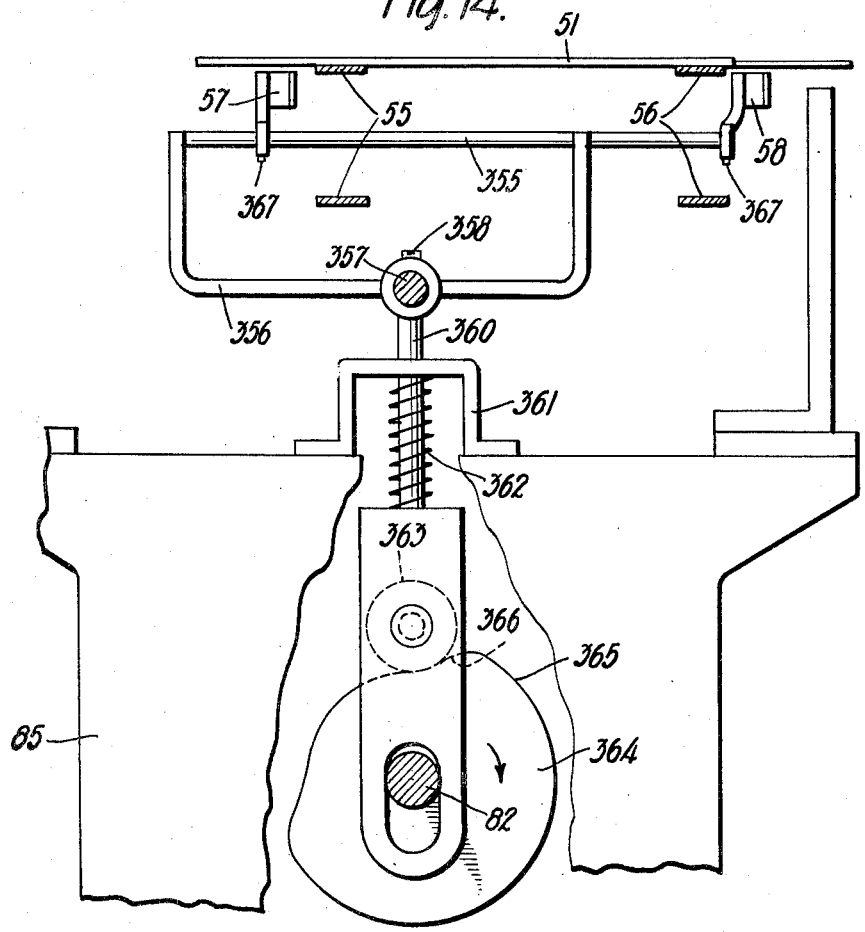
Figure 14 illustrates the aligning means including stops for registering the envelopes individually with the fastener attaching mechanism.

After the envelope is aligned it is moved lengthwise of itself or transversely of the conveyor belts to the clasp attaching press 60 by reciprocating transfer mechanism 65. (Figures 1, 16, 24 and 25). As soon as the fastener 61 is attached and the perforation 62 formed, the envelope is withdrawn from the clasp attaching device 60 and returned to the conveyor belts to be fed thereby to another station where it is arrested by a second set of aligning stops 66 and 67 (Figures 1, 11 and 14) to register it with suitable riveting means 70 (Figures 1 and 11) by which securing prongs 71 of the fastener 61 (Figures 4 and 5) are flattened so as to avoid obstruction to articles which may be inserted into the envelope; said riveting means being operated in a manner hereinafter described and which is moved lengthwise of the envelope into co-operative relation therewith (Figures 7 and 25).

After the prongs 71 have been flattened the riveting means 70 is returned to normal and the aligning stops 66 and 67 are lowered. The envelope is then carried farther by the conveyor belts and is deposited on a receiving device 72 (Figures 1, 6 and 38) where the envelopes are grouped in packs of predetermined number as hereinafter described, to facilitate their removal from said table by the attendant of the machine.

A detail description of the machine will now be given. An electric motor 75, Figure 1, may be provided to drive the machine, said motor driving a belt 76 which rotates a pulley 77 secured to a shaft 78 of the clasp attaching press 60. To the shaft 78 is secured a sprocket 80 which drives a chain 81 to rotate a main shaft 82 (Figures 8 and 9) through the medium of a sprocket 83, which sprocket may rotate freely on said shaft 82; the various devices of the envelope feeding mechanism being operated from the shaft 82.

The shaft 82 supported in end plates 84 and 85 may be connected to the sprocket 83 at will through the medium of a clutch element 86 slidingly supported on the shaft 82 between the sprocket 83 and a collar 87; the clutch element being connected to rotate with said shaft, by a key 88. The sprocket 83 may be provided with a projection 90 which extends towards the clutch element 86 and engages a similar projection 91 on said clutch element to rotate said clutch element and consequently the shaft 82. A clutch control lever 92 is pivotally supported on a bracket 93 to connect or disconnect the shaft 82 with the sprocket 83. Said lever is provided with a projection 94 extending into an annular groove 95 of the clutch element 86 so that the lever 92, when operated by its free end 96 slides the clutch element rightwardly or leftwardly on the shaft, Figure 9, to disconnect or connect said shaft respectively with the drive including the sprocket 83.

The rollers 53 and 54, Figures 8, 9, 12 and 15 by which the envelopes are fed from the hopper 52 are driven by means connected to the shaft 82 and hereinafter described. They are resiliently held in contact with each other to insure effective feeding pressure on the envelopes. To this end the feed roller 53 may be secured to a shaft 100 supported in standards 101 and 102 secured respectively to bars 103 and 104, which bars are secured to the end plates 84 and 85. The roller 54 is supported on a shaft 105 having bearing arms 106 secured thereto, by which said shaft is swingingly supported on studs 107. A spring 108 is provided, which through the medium of a plunger 110, engaging one of the arms 106, presses the roller 54 against the roller 53. Another spring 111 may be provided at the other end of the rod 105 to assist in pressing the roller 54 against the roller 53. The shaft 100 which is rotated in a manner presently to be described to drive the feed roller 53, has secured thereto a gear 112 which meshes with a pinion 113, secured to the shaft 105, to drive the feed roller 54, at the same surface speed as that of the roller 51.

The means connected to the shaft 100, to drive the rollers 53 and 54, may include a bevel gear 115 on the main shaft 82 (Figures 6, 8 and 9) meshing with a bevel gear 116 to drive a counter shaft 117 supported in brackets 118 on the end plate 84. Secured to the counter shaft 117 is a sprocket 120 which drives a chain 121 connected with a sprocket 122 secured to the shaft 100 to rotate the latter and thus rotate the feed roller 53, and the feed roller 54 through the gear 112 and pinion 113 as previously described. The feed roller shaft 100 may be provided with a fly wheel 119 to keep the machine running smoothly.

Figure 15:
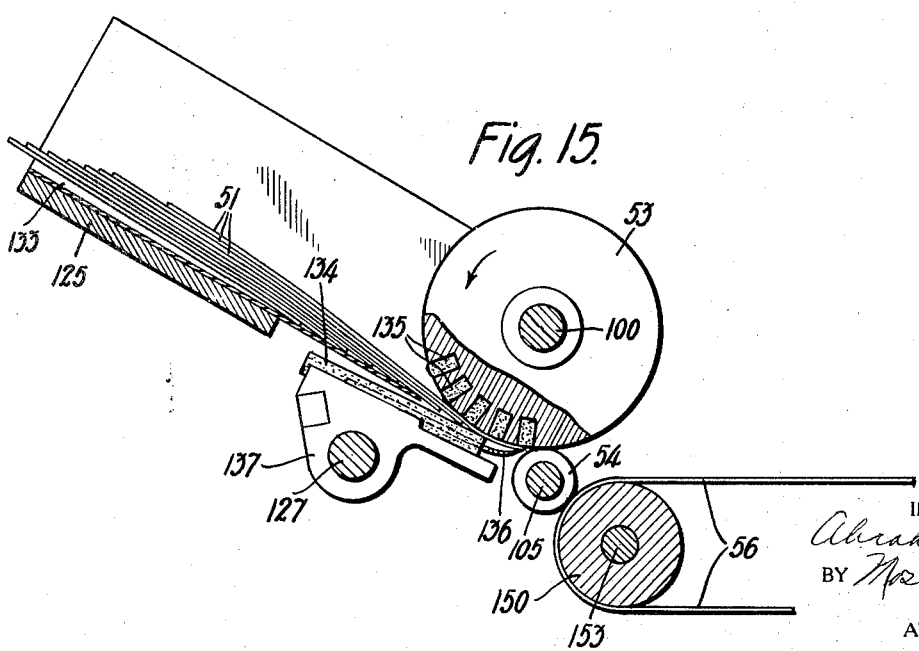
Figure 15 is a sectional side view taken on the line 15—15 of Figure 12 and illustrates the method of feeding the envelopes from the hopper to the conveyor belts.

The hopper includes a base board or floor 125, Figures 9, 10, 12 and 15, secured to a bracket 126 which is fastened to a bar 127 adjustably mounted in slots 128 in the standards 101 and 102 so that the hopper floor 125 may be properly adjusted relatively to the feed rollers 53 and 54. The hopper further includes side walls 130 and 131 between which the envelopes are placed on the floor 125 as seen in Figures 12 and 15. The wall or gage 131 is adjustable slightly to determine the starting position of the envelopes with respect to the conveyor belts 55 and 56 and other devices hereinafter described. The other wall 130 is adjustable towards and away from the wall 131 to accommodate envelopes of different lengths. The side walls 130 and 131 may be secured in position in any convenient manner as for example, by means including wing nuts 132.

To reduce the friction of the envelopes on the floor 125 to a minimum the floor is provided with a metal lining 133ª and a rib 133 which rib reduces the area of contact of the envelopes with the floor. A finger slot 133ᵇ is provided in the floor 125 to facilitate therein a section or removal of envelopes.

To insure the delivery of one envelope at a time from the hopper 52 they are placed into the hopper in overlapping relation or, in other words, with the side edge of each projecting beyond the side edge of the following one as in Figure 15. The hopper floor is inclined so as to cause the pack of envelopes to move towards and under the feed roller 53, thus causing the edges of envelopes to engage a holding pad 134 which may be composed of rubber and which tends to hold the envelope back so as to prevent its accidental discharge from the hopper when a superposed envelope is being fed by the roller 53; the feed roller 51 having a periphery the greater part of which is smooth and which surface is ineffective to start the envelope from the hopper. The starting of each envelope from the hopper may be effected by pads 135, Figure 15, of soft material such as rubber which are embedded in the feed roller 53 and project slightly therefrom. During the rotation of said feed roller the pads 135 engage the uppermost envelope to feed it from the hopper while the next envelope is held back by the rubber pad 134. As the envelope proceeds from the hopper it is conducted between the feed rollers 53 and 54 by a guide 136. The envelope is then fed by the feed rollers 53 and 54 to the conveyor belts 55 and 56.

The holding pad 134 may be secured in any convenient manner to a block 137 (Figure 9) held on the rod 127 by a set screw 138. Said pad is adjustable so as to procure its proper rotation with respect to the feed rollers 53 and to take up wear of said pad. To this end there is provided a set screw 140 which may be threaded into said block and bears against a shoulder 141 of a collar 142 (Figure 12) secured to the rod 127.

The guide 136, which conducts the envelope between the feed rollers 53, and 54, may be secured to the block 137 by screws 143. It may be provided with a slot 144 through which the pad 134 extends. Said guide is resilient and may be adjusted independently of the block 137, to establish its proper relation with respect to the feed rollers 53 and 54, by set screws 145, (Figure 9) which are threaded into the block 137 and engage the bottom face of said guide.

The conveyor belts 55 and 56 are conducted over rollers 150 and 151, Figures 1, 6, 7, 9 and 11, located at the left and right hand sides of the machine respectively; the roller 150 being secured to a shaft 153 rotatively supported in the standards 101 and 102, (Figures 1 and 8); the roller 151 being mounted on a shaft 154 supported in standards or brackets 155 and 156. To drive the conveyor belts 55 and 56 the shaft 153 to which the left hand roller 150 is secured has fastened to one end (Figures 8 and 9) a pinion 157 which is driven by a gear 158 secured to the feed roller shaft 100 thus causing the upper reach of the belts 55 and 56 to travel away from the hopper and carry therewith the envelopes, as they pass from the feed rollers 53 and 54, to the aligning stops 57 and 58 which stops, it will be remembered, align the envelopes with respect to the clasp fastening mechanism 60.

Provision is made to guide the belts 55 and 56 laterally. To this end two sets of guide pins 157 and 158 (Figures 8 and 9) are secured to a rod 159ª supported on fixed brackets 159. The pins 157 and 158 are adjustable lengthwise of the rod 159ª and accordingly the belt 55 may be adjusted lengthwise of the rollers 150 and 151 to accommodate envelopes of various lengths. Similarly the belt 56 may be adjusted, if necessary, lengthwise of the rollers 150 and 151, but the major adjustment for envelopes of various sizes is made by the belt 55.

To insure feeding movement of the envelopes by the conveyor belts 55 and 56 devices are provided to press the envelopes lightly against said belts. Said devices may include three sets of rollers co-operating with each belt, one set 160, 161 (Figure 7), another set 162, 163 and a third set 164, 165, all of these three sets engaging the belt 55; sets 160ª, 161ª 162ª, 163ª, 163ᵇ and 165ª cooperating with the belt 56, the rollers 160, 161, 160ª and 161ª forming one group, the rollers 162, 163, 162ª, 163ª and 163ᵇ forming another group, and the rollers 164, 165, 164ª and 165ª forming still another group.

The guide rollers 160, 161 of the first group are supported on arms 166, Figure 7, of a U-shaped bracket 167 adjustably secured to a rod 168 by a set screw 170. The rod 168 is supported on the rod 159ª to which it is adjustably secured by a set screw 171. Each of the guide rollers 160 and 161 is adjustable lengthwise of its supporting arm 166 by collars 172 secured to the arm by set screws 173. The other guide rollers 160ª and 161ª, of the same group, which co-operate with the belt 56 are supported similarly to the rollers 160 and 161 the parts similar to 166, 167, 168, 170, 171, 172 and 173 bearing the reference characters 166ª, 167ª 168ª, 170ª, 171ª, 172ª and 173ª respectively. It will be understood that the rollers 160, 161 and 160ª, 161ª may be properly adjusted to the conveyor belts 55 and 56, Figures 6, 7, 8 and 9, by swinging the brackets 167 and 167ª about the axes of the horizontal portions of the rods 168 and 168ª, and by swinging said rods 168 and 168ª about the axis of the rod 159ª, after which they are secured by set screws 170, 171 and 170ª, 171ª.

As the envelope in transit approaches the position opposite the clasp attaching press 60 the aligning stops 57 and 58, which may later be depressed in a manner and for a purpose hereinafter described, are in the path of the envelope to arrest the envelope, Figures 7 and 16, and align it with respect to the press 60. While the envelope is thus arrested by the stops the belts 55 and 56 slip relatively thereto, said belts running continually while the main shaft 82 is connected to the motor drive including the sprocket 83.

The envelope after being arrested by the stops 57 and 58 is moved transversely of the conveyor belts 55, 56 by the transfer mechanism 65 to the press 60 where the fastener 61 is attached to the body of the envelope, and where the flap of the envelope is perforated in a manner hereinafter described. The envelope transfer mechanism 65 may include a slide 175 (Figures 6, 7 and 16) to travel in a guide way 176 secured to the bars 103 and 104. The slide has suitably secured thereto, a horn-like arm 177 upon which may be formed one jaw 178 of a gripper, 180. The other jaw 181 of the gripper is pivotally supported by a shaft 182 on the arm 177. To operate the gripper the shaft 182 has secured thereto an arm 183 having a roller 184 engaging under a stationary cam 185 at the upper end of a bracket 186 which may be adjustably secured to the guide way 176 by a bolt 187, Figure 24. Said roller 184 normally engages under the cam 185 as in Figure 16, to hold the gripper open, or in other words, to hold the jaw 181 away from the jaw 178 against the action of a spring pressed plunger 188 suitably connected with an arm 190 of the jaw 181. Actuating means 191, hereinafter described, moves the slide 175 rightward in Figure 16 after the envelope has been arrested by the stops 57, 58. During the initial part of the movement of said slide 175 the roller 184 moves from under the cam 185 thus enabling the jaw 181 to be operated by the spring pressed plunger 188 to close the gripper and take hold of the envelope 51. The envelope is then pushed rightwardly to the press 60, by the slide, (Figure 24) where the back of the envelope 192 has been conducted over an anvil 193 of the press 60, in a manner hereinafter described, so that the clasp 61 may be attached to the back 192 of the envelope and so that the closure flap 63 may be perforated.

The slide operating means 191, Figures 6 and 16, may include a spring 195 connected to an arm 196 of a bell-crank 197 to swing the latter in a clockwise direction about a supporting rod 198 mounted in the walls 84 and 85 of the machine frame. The other arm 200 of the bell-crank 197 is connected to the slide 175 by a link 201; said link being connected to the slide 175 by a beaded stud 202 and to the arm 200 through the medium of a block 203 pivoted on the arm 200 by a stud 204; the link 201 being secured to the block by nuts 205. The arm 196 of the bell-crank is provided with a follower 206 which is held by the action of the spring 195, in contact with the periphery of a cam 207 secured to the main shaft, said cam being shaped to enable the spring 195 to move the slide 175 in one direction to transfer the envelope to the press 60 and actuate the bell-crank 197 against the action of the spring 195 to return the slide to normal and thus withdraw the envelope from the press to return it to the conveyor belts 55, 56. As the envelope transfer mechanism 65 approaches its normal position the roller 184 moves under the cam 185 to open the gripper 180 and thus release the envelope which may then be conveyed to the next station (riveting means 70), after the aligning stops 57 and 58 have been withdrawn from its path in a manner hereinafter described.

To facilitate entrance of the press anvil 193 into the envelope, each envelope is fed from the hopper with its back upward and the closure flap 63 is conducted under the anvil 193 by a guide 209, Figures 7 and 16, which is inclined downwardly towards the anvil to direct said flap under the anvil while the envelope is in transit. A guide 210, Figures 7, 11 and 17, which may be secured to the side of the press frame 222 may conduct the flap 63 over a plate 225 of the press. After the envelope has been arrested by the aligning stops 57, 58, a lifter 211, Figures 11, 16, 22 and 23, is operated against the action of a return spring 212, by a cam 213 secured to the main shaft 82. Said cam engages a follower 214 to actuate the lifter 211 and buckle the envelope to raise the back 192 thereof above the anvil 193 and away from the flap 63, as in Figures 22 and 23, so that the envelope may readily slip over said anvil as in Figures 24 and 25 by further movement of the transfer means 65 including the gripper 180.

The clasp attaching press 60 includes a holster 215, Figure 16, which delivers the clasps 61 to the envelopes 51. When the clasp is to be attached to the envelope a plunger 216 is operated in a manner hereinafter described. The plunger when operated descends, and it is provided with two spring pressed pins 217 which enter the perforations 218 (Figure 2) of the fastener 61. After the fastener has been impaled on the pins 216 the holster is operated to swing it clear of the path of the plunger thus discharging the fastener from the holster; the pins 217 reaching the anvil before the fastener has been completely removed from the holster 215, so as to prevent accidental shifting of the fastener relatively to the envelopes while being removed from the holster. When the holster is clear of the plunger 216, the latter continues in its downward movement to attach the fastener to the back of the envelope (Figures 4 and 24). The securing prongs 71 extend downwardly from the fastener and pierce the envelope while being attached. To assist in this piercing operation and also bend the prongs 71 back on the inside of the envelope to secure the fastener, the anvil is to be provided with two knobs 220. It will be understood that the pins 217 move up into the plunger 216 while the fastener is being attached. The anvil 193 is pivotally supported at 221 (Figure 16) on the body 222 of the press and is normally held against a stop 223 by a spring 224 so as to provide clearance for the flap 63 of the envelope. When the plunger 216 is operated, however, the anvil is moved down thereby and is arrested against a top plate 225 of said press.

To form the perforation 62 (Figure 2) in the closure flap 63 the press 60 is provided with a punch 226, Figures 16 and 24, which is operated simultaneously with the plunger 216 in a manner disclosed in the above mentioned patent. A reinforcing patch 227 may be applied to the flap 63, by means of gum, in any convenient manner, before the perforation 62 is formed.

To position the gripper properly, the follower 206 associated with the cam 213, Figure 16 is adjustable towards or away from the shaft 198 in a slot 230 of the arm 196. When shorter envelopes are to be handled by the machine the starting position of the slide 175, and the gripper 180 carried thereby, must be to the right of the position indicated in Figure 16. Accordingly, the effective length of the link 201 may be increased by adjusting it with reference to the block 203 by means of the nuts 205, thus establishing a new starting position for the gripper 180. The bracket 186 (Figure 24) may be adjusted in a slot 231 to set the cam 184 properly with respect to the arm 183 which operates the gripper jaw 181. The stud 232 to which the spring 195 is connected may be adjusted in the slot 230 of the bell-crank arm 196 to adjust the action of the spring 195.

To assist in properly locating the envelopes with respect to the press 60 there may be provided a gage or abutment 233, Figures 7 and 16, which engages the bottom edge of each envelope just before the latter is grasped by the gripper 180. The gage 233 is made sufficiently high to prevent accidental mounting thereof by said envelope; said gage extending through an aperture 234 formed in the upper jaw 181 of the gripper.

Provision is made to prevent collision of the gripper 180 with the conveyor belt 55 when an envelope is to be transferred to the press 60. To this end there may be provided a guide roller 235, Figures 7, 17 and 19, which may be operated in a manner hereinafter described to depress the upper reach of the belt 55 as indicated in Figures 18 and 20, so that the gripper 180 may move freely over said belt.

To operate the belt depressor roller 235 there may be secured to the main shaft 82 a cam 236, Figures 6 and 17, which normally holds up a suitably guided link 237 against the action of a spring 238, and through the medium of a follower 240 on said link. At the top of the link 237 is secured a block 241 provided with a horizontal bar 242 upon which is mounted an upwardly extending arm 243. To the arm 243 is adjustably secured a bracket arm 244 which carries the belt depressor roller 235; said bracket arm 244 being secured to the arm 243 by a screw 245. When the low part 246 (Figure 18) of the cam 236 reaches the follower 240, the spring 238 pushes the link 237 downwardly thus actuating the roller 235 to depress the upper reach of the belt 55 between the rollers 150 and 151, as in Figure 20. A belt support 247, Figures 17 and 19, is located directly under the roller 235, and is adjustably secured to a horizontal bar 248 secured to the arm 243 so as to move up and down with the roller 235 when the latter is actuated.

Anti-buckling means 250 is provided to prevent upward buckling of the envelope 51 being transferred to the clasp attaching press 60. Said means may include a guide bar 251, Figures 6, 7, 17 and 18, which is normally raised to permit free passage of the envelope while being carried by the conveyor belts. Before the envelope is transferred to the press 60 however, the anti-buckling bar 251 is lowered as in Figure 18, by means hereinafter described, to lie close to the envelope and thus prevent buckling thereof.

To effect the lowering and raising of the anti-buckling bar 251 it may be supported on a plunger 252, Figures 1, 17 and 18, guided in the bar 103, of the machine frame and a bracket 253 secured to the bar 103. A cam 254 on the main shaft 82 engages a follower 255 of a bell-crank 256 pivotally supported on the rod 198 and held in place lengthwise thereof by collars 257 (Figure 6). An arm 258 of the bell-crank engages the lower end of the plunger 252 to hold it up against the action of a spring 260, Figure 17, and consequently keep the anti-buckling bar 251 in its raised position. The cam 254 is provided with a depression 261 which, as it reaches the follower 255, permits the plunger 252 to be depressed by the spring 260 to thus lower the anti-buckling bar 251 to the position in Figure 18. The envelope 51 may then be transferred to the clasp attaching press 60 as previously described. A guide pin 262 secured to the plunger 252 engages in a slot 263 of the bracket 253 to prevent accidental rotation of the plunger 252 about its axis, and thus keep the bar 251 from swinging out of place.

To prevent downward buckling of the envelope 51 there may be provided a fixed guide 264 (Figure 16) which may be supported by a bracket 265 secured to the guide way 176; said guide 262 being channel shaped and being provided with two walls 266 and 267 for a purpose hereinafter described.

To conduct the envelope under the anti-buckling bar 251 while it is being carried from the hopper by the conveyor belts 55 and 56, a plurality of guide fingers 270, Figures 7, 9 and 17, may be supported on a horizontal bar 271 secured to the bar 104 of the machine frame. The guide fingers 270 are adjustable about the axis of the bar 271 so that their free ends may readily be located relatively to the anti-buckling bar 251. They are also adjustable lengthwise of the bar 271 according to the length of the envelopes. Said guide fingers 270 may be secured in position by set screws 272. The guide roller 162, Figure 7, also assists to conduct the envelope 51 under the anti-buckling bar 251. To conduct the envelope under the guide roller 162 a guide finger 273, Figure 7, may be adjustably secured to the bar 271.

To conduct the envelope over the walls 266 and 267 of the guide 264, so as to prevent obstruction to the edge of the envelope, said walls are provided with guide fingers 278 and 279 respectively (Figures 20 and 21) over which the envelopes are conducted; said fingers being curved and extending slightly above the upper edges of the walls 266 and 267.

To conduct the bottom edge of the envelope 51 into alignment with the gripper 180 there may be provided a guide 280 (Figures 7 and 17) on a block 281 adjustably secured to the bar 248 so that it may be properly located transversely of the machine according to the length of the envelopes. The lips of said guide may be separated more at the left side (Figure 7) than at the right side so as to facilitate ready entrance of the envelope into said guide. Similarly, the free ends of said lips which extend towards the rear of the machine, may be separated as in Figure 17 so as to enable the bottom of the envelope to re-enter the guide readily upon its return from the press 60. Guides 280ª and 280ᵇ are arranged above the envelope, and a guide 280ᶜ (Figures 6 and 7) is arranged beneath the envelope to assist the envelope into the guide 280.

To assist the bottom edge of the envelope under the feed roller 163 when the envelope returns from the press 60, the feed roller 163 is tapered as in Figure 7. The guide finger 273 may be bent downwardly towards the roller 162 to guide the envelope under the said roller. The guide rollers 163 and 163ª not only assist the belts 55 and 56 to convey the envelope but they also assist in guiding the envelopes into engagement with the stops 57 and 58.

To hold the belt 55 effectively against the roller 163, there may be provided a resilient finger 282 (Figures 7, 19 and 20) which engages under the upper reach of the conveyor belt 55 to press the envelope against the roller 163 thus producing sufficient friction to feed the envelopes. Co-operating with the roller 163ª is a resilient finger 283, Figures 7, 11 and 28, which may be secured to the press frame 222 and engages under the upper reach of the conveyor belt 56 to press the envelope against the roller 163ª. A similar resilient finger 284, Figures 7, 9, 11 and 17, may also be secured to the press frame 222 to engage under the upper reach of the belt 56 to press the envelope against the feed roller 162ª.

To lift the two sets of feed rollers 162, 162ª, 162ᵇ and 163, 163ª from the envelope so as not to interfere with its passage to the press 60, said rollers may be supported on a horizontal bar 290, Figures 7, 26 and 28, which is operable in a manner hereinafter described.

To mount the feed rollers 162 on the bar 290, it is supported on the horizontal portion of an L shaped bracket 291 (Figures 7 and 17) adjustably secured to a horizontal arm 292 by a set screw 293, the arm 292 being secured to the bar 290 by a set screw 294 so that it may be adjusted lengthwise of the bar 290 with the feed roller 162, according to the length of the envelope; said roller 162 being adjustable lengthwise of the bar 292 according to the width of the envelope.

The feed roller 163 is rotatably supported on an L shaped bracket 295 (Figures 7 and 26) secured to a bar 296 by a set screw 297 along which said roller 163 is adjustable according to the width of the envelope; the bar 296 being secured to the bar 290 by a set screw 298 to facilitate the adjustment of the roller 163 lengthwise of the envelope according to its length. The guide rollers 162 and 163ª are supported similarly to the rollers 162 and 163 on a horizontal bar 300 secured to the bar 290 by a set screw 301 and are adjustable lengthwise of the bar 300 to the proper position. The guide roller 163ᵇ is also supported on the bar 300 through the medium of a bracket 302. A guide 299 (Figures 6 and 7) may be supported on the rod 296 to assist in guiding the bottom of the envelope to the stop 57.

The means for operating the bar 290 which carries the rollers 162, 163, 162ª, 163ª and 163ᵇ may include a cam 305 secured to the main shaft 82 (Figures 6 and 27) which is provided with a depression 306 in which a follower 307 of a bell-crank 308 is normally located. The bell-crank 308 is pivoted on the rod 198, see Figure 26 also, and is provided with an arm 310 which engages a plunger 311 to actuate it against the action of a spring 312. To the upper end of the plunger 311 is secured the bar 290. During the rotation of the shaft 82, the high part 313 of the cam rocks the bell-crank to lift the plunger 311 against the action of the spring 312 to lift all of the rollers mounted on the bar 290 away from the envelope as in Figure 28. The plunger 311 may be guided in the bar 103, of the machine frame, and a bracket 313 secured to said bar 103. To prevent accidental swinging of the parts carried by the plunger about the axis of the latter, said plunger has secured thereto an arm 314 which plays back and forth in a slot 315 in the bracket 313.

The actuation of the clasp attaching press 60 may be partly controlled by a cam 315 (Figures 6, 26 and 28) secured to the main shaft 82; said cam engaging a follower 316 to hold up a plunger 317 against the tension of a spring 318 which is connected between said plunger and a tie rod 319; the plunger 317 being connected by a link 320 to a clutch operating lever 321 secured to a rock-shaft 322 of the press 60. After the envelope 51 has been transferred to the press 60, as in Figure 24, a depression 315ª in the cam 315 reaches the follower 316 to enable the plunger 317 to be actuated by the spring 318 to operate the clutch lever 321. The lever 321 when operated actuates a clutch (not shown) to connect the shaft 78 (Figure 1) with suitable means to operate the clasp attaching plunger 216 and the punch 226 (Figure 24) of the press 60. It will be understood that as the main shaft 82 continues to rotate the plunger 317 is restored to normal. The feed of envelopes by the conveyor belts is so timed with respect to the cam 315 that the depression 315ª of said cam reaches the follower every time an envelope is in the clasp attaching station so that the clutch lever 321 of the press 60 may be operated.

The conveyor belts may run idly as for example when the hopper has been emptied of envelopes. Consequently, provision is made to prevent the actuation of the press 60 in the absence of an envelope at the clasp attaching station when the depression 315ª of the cam 315 reaches the follower, to thus prevent wasting of the fasteners and also prevent possible jamming of the fasteners in the press which would otherwise follow.

To determine whether or not the press should operate, there may be provided a feeler 322 (Figures 7, 11, 25, 26, 28 and 30) secured to a rock-shaft 323 supported in a bracket 324ª and an ear 324 of the bracket 156 which feeler controls the operation of the plunger 317. While the envelope is being transferred to the press, the feeler 325 may be actuated, in a manner hereinafter described, to cause its free end to drop against the envelope 51, which envelope is being partially supported by the guide 264. In the presence of an envelope the feeler is operated idly and the plunger 317 which actuates the clutch lever 320 of the press, is permitted to be operated to effect the actuation of the press 60. In the absence of an envelope at the clasp attaching station the feeler moves deeper than the plane of the envelope and effects locking of the plunger 317 by swinging a locking element 325 about a pivot 326 on a bracket 326ª against the tension of a return spring 327, and under a projection 328 on the plunger 317 to lock the plunger 317 and thus prevent the actuation of the press clutch lever 320 so that the press 60 remains unactuated.

To enable the feeler to operate at the proper time there may be secured to the main shaft 82, a cam 330 having a depression 331 (Figures 6, 26 and 28) into which a follower 332 on a lever 333 may drop while the envelope transfer mechanism 65 is moving towards the press 60. The lever 333 is secured to a shaft 334 supported at one end by a bracket 335, and at the other end by the end wall 85 of the machine frame. The lever 333 is connected by a link 336 to an arm 337 secured to the shaft 323 to swing the free end of the feeler 322 downwardly when the follower 332 enters the depression 331 of the cam 330 which may be caused by gravity or spring pressure. The shaft 334 has secured thereto an arm 340, to the upper end of which is connected a thrust rod 341, the free end of which is suitably guided to engage the locking element 328 and swing it under the projection 328 of the plunger 317, in the absence of an envelope at the feeler 322. When an envelope is in the path of the feeler 325, or in other words, at the clasp attaching station, the feeler 325 is arrested soon enough by the envelope to prevent the operation of the locking element 325 thus permitting the plunger 317 to be operated to actuate the clutch lever 320 as previously described to effect the operation of the press 60.

The locking element 325 may be set in its effective position, at will, as in Figures 26 and 31, to prevent the operation of the press 60. To this end there is provided a thrust rod 342 guided at its forward end in a bracket 343 secured to the bar 103 of the machine frame, and provided with a finger piece 344 by which it may be operated. When the rod 342 is pushed in the locking element 325 it is swung to its effective position under the projection 328 of the plunger 317 to prevent the operation of the press 60 by the plunger 317. A spring 345 presses against the rod 342 to cause a projection 346 to engage behind the bracket 343 and hold the rod 342 in its operated position. A stop 347 may be provided which engages the bracket 343 to prevent excessive movement of the thrust rod 342 when it is returned to normal position, Figure 26.

The trough like guide 264 (Figures 16, 20 and 21) into which the feeler 322 moves may be composed of a plurality of telescoping sections 350, 351 and 352 which may be secured to each other by bolts 353. Thus said guide may be shortened or lengthened according to the length of the envelope.

After the envelope has been restored to the conveyor belts 55 and 56, the guide rollers 162, 162ª, 163, and 163ª and 163ᵇ are lowered against said envelope to continue its feed. Before the envelope can be fed further, however, the aligning stops 57 and 58 must be removed from its path.

To facilitate the removal of the aligning stops 57 and 58 from the path of the envelope they are mounted on a transverse bar 355 (Figures 11, 14, 26 and 32) of a frame 356 secured to a longitudinally extending bar 357. The bar 357 is secured by a set screw 358 to the upper end of a plunger 360 guided on the main shaft 82 and a bracket 361 secured to the end wall 85 of the machine frame. The plunger 360 is pressed downwardly by a spring 362 to keep a follower 363 in contact with a cam 364 secured to the main shaft 82. When the follower 363 engages the high part 365 of the cam 364, Figure 33, the plunger 360 is held in its raised position to hold the aligning stop in the path of the envelope. When the follower 363 enters the depression 366 of the cam, the plunger 360 is lowered by the spring 362 to withdraw the aligning stops from the path of the envelope thus permitting it to be fed from the fastener attaching station to the riveting means 70 (Figure 7). The stops 57 and 58 are secured to the bar 57 by set screws 367 (Figure 14) to facilitate their adjustment, lengthwise of said bar, according to the size of the envelope.

The aligning stops 66 and 67 which arrest the envelope at the riveting means 70 are supported on a bar 372 (Figures 7 and 11) of a frame 373 secured to the bar 357 which is carried by the plunger 360, hereinbefore described, so that the stops may be moved into and out of the path of the envelope with the stops 57 and 58 to retain the envelope while the clasp is being riveted, and enable it to be subsequently fed from the riveting position. Said stops 66 and 67 are adjustable lengthwise of the bar 372 according to the length of the envelope.

To facilitate the feeding of the envelopes 51 the rollers 164, 165 and 165ª (Figure 7) are carried by arms 375, 376, 377 respectively, pivotally supported on stationary arms 378, 379 and 380 about which the rollers may swing bodily to bear against the envelope. The arms 378 and 379 are supported on a stationary bar 381 along which they are adjustable to effect adjustment of the rollers 164 and 165 according to the width of the envelope. The bar 380 is similarly supported on a stationary rod 382 to effect an adjustment of the roller 165ª widthwise of the envelope. The bars 381 and 382 are supported on a rod 383 supported in the bracket 155 and an ear 384 of the bracket 156, Figure 7. The bars 381 and 382 are adjustable lengthwise of the rod 383 according to the length of the envelope. The rollers 165 and 165ª are close to the stops 370 and 371 to guide the envelope into engagement with said stops. Guides 383ª and 383ᵇ assist in guiding the envelope to the stop 370.

The riveting means 70 (Figures 7, 11 and 32) which flattens out the securing prongs 71 from the position of Figure 4 to the position in Figure 5, may include an anvil 385 and a hammer 386 supported on a lever 387 pivoted by a stud 388 on the side wall 85 of the machine frame. The anvil 385 and hammer 386 normally stand clear of the envelope 51, as in Figures 7 and 32, but may be swung to the position in Figures 25 and 37 to cause the back 192 of the envelope with attached fastener to mount the anvil 385. The hammer 386 is then tripped automatically in a manner hereinafter described, and is snapped down against the anvil 385 by a spring 390 to flatten the prongs 71.

To facilitate the entrance of the anvil 385 into the envelope, the flap 63 is conducted under the anvil by a guide 391 (Figures 7 and 11) which may be supported on the bracket ear 324, and is inclined downwardly towards the anvil 385. A lifter 392 (Figures 11, 34 and 35) is secured to a horizontal extension 393 of a plunger 394, which is actuated against the action of a spring 395, by a cam 396 on the main shaft 82 from the position in Figure 34 to the position in Figure 35, buckle the envelope and thus lift the back 192 of it to open said envelope as in Figures 35 and 36 so that the anvil 385 may readily enter the envelope.

Figure 37:
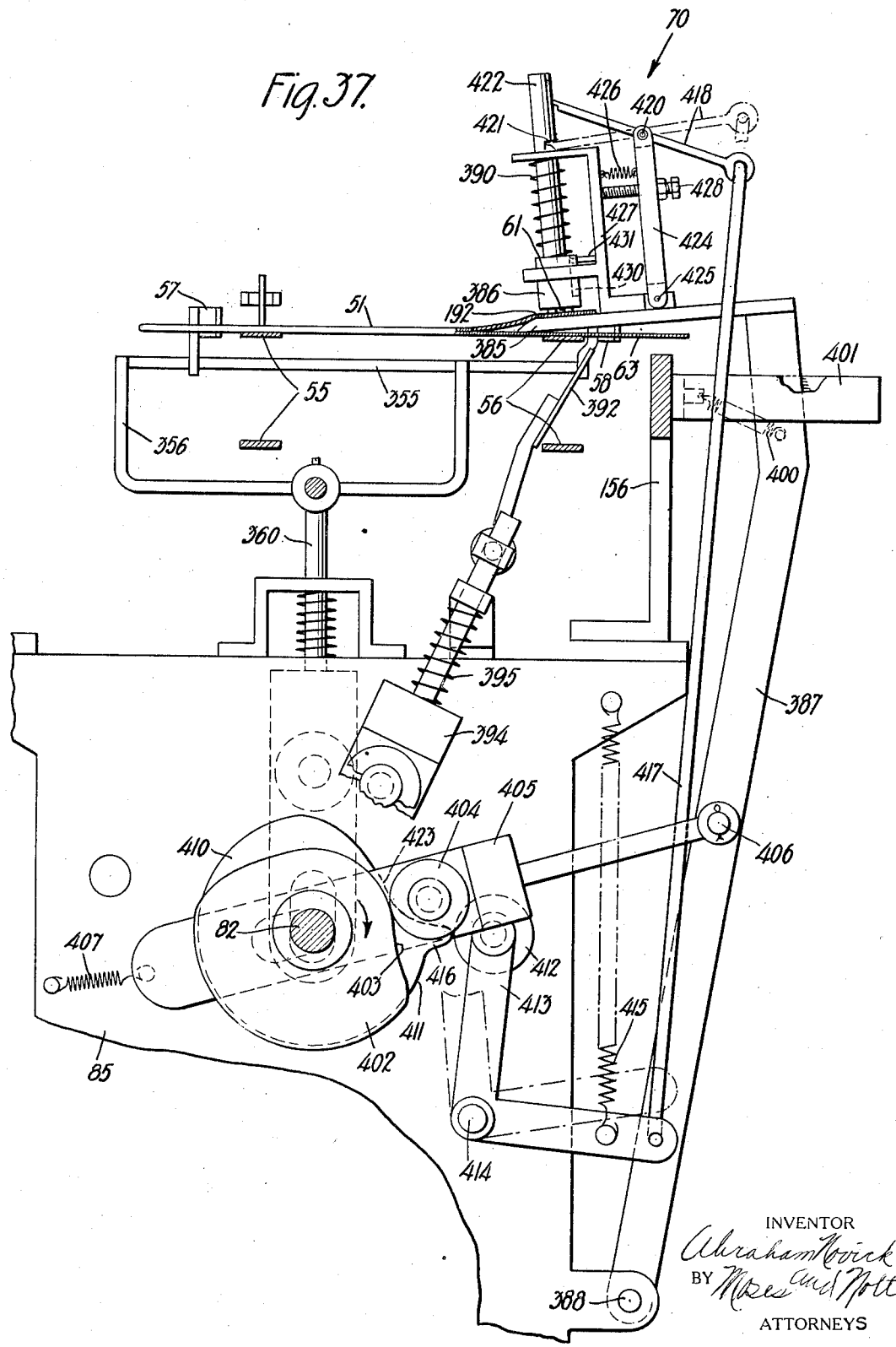
Figure 37 is a view similar to Figure 32 but illustrates the anvil inserted into the envelope and the hammer released, it also shows the aligning stop about to be lowered to enable the envelope to be fed on from the rivet flattening position.

To operate the lever 387 and thus swing the anvil 385 and hammer 386 to their riveting position, Figure 37, there is provided a spring 400 connected to the lever 387. The lever 387 may be guided in its movements in a bifurcated bracket 401. The movement of the lever 387 is controlled by a cam 402 on the main shaft 82 which cam is provided with a depression 403 into which a follower 404 of a link 405 moves when the anvil carrying lever 387 is operated by the spring 400; said link 405 being connected to the lever 387 by a stud 406. The movement of the lever 387 may be further assisted by a spring 407 connected to the end of the plunger 405. It will be understood that as the shaft 82 continues to rotate the lever 387 is restored to its normal position (Figure 32) by the high part of the cam 402 against the action of the springs 400 and 407.

To release the hammer 386, so that it may be operated by the spring 390, there is secured to the main shaft 32 a cam 410 (Figures 32 and 37) having a dwell 411 against which a follower 412 of a bell-crank 413 normally bears. The bell-crank is pivoted on the wall 85 of the machine frame by a stud 414 and is acted upon by a spring 415. A projection 416 on the cam 410 swings the bell-crank 413 against the action of the spring to pull downwardly on a link 417 to swing a lever 418 about a pivot 420 from the position in Figure 32 to the position in Figure 37. It will be understood that while the lever 418 is being operated, the free end thereof is withdrawn from a notch 421 in the stem 422 of the hammer 386 thus releasing said hammer which is then operated by the spring 390 as in Figure 37.

To enable the lever 418 to re-engage the notch 421, the cam 410 is provided with a depression 423, just beyond the projection 416, into which the follower drops, thus moving the lever 418 to the dotted line position in Figure 37. Provision is made to enable the hammer operating lever 418 to move bodily rearward as the free end thereof slides down along the stem 422 in order to snap into the notch 421. To this end the pivot 420 of said lever 418 is carried on a link 424 which swings about a stationary pivot 425 against the tension of a spring 426 connected to the link 424 and a bracket 427 which supports the hammer 386. An adjustable stop or set screw 428 is carried by the link 424 and engages the bracket 427 to limit the movement of said link towards said bracket, so as to facilitate the withdrawal of the lever 418 from the notch 421 when said lever is operated by the link 417. To prevent rotation of the hammer 386 about its axis so as to keep the slot 421 always facing the lever 418, the hammer is provided with a slot 430 into which projects a stud 431 secured to the bracket 427.

After the prongs of the clasp have been flattened by the riveting means 70 the stops 370 and 371 are lowered out of the path of the envelope so that it may be discharged from the conveyor belts 55 and 56 over the roller 151 at the right hand side of the machine (Figure 1) to the receiving device 72.

Figure 38:
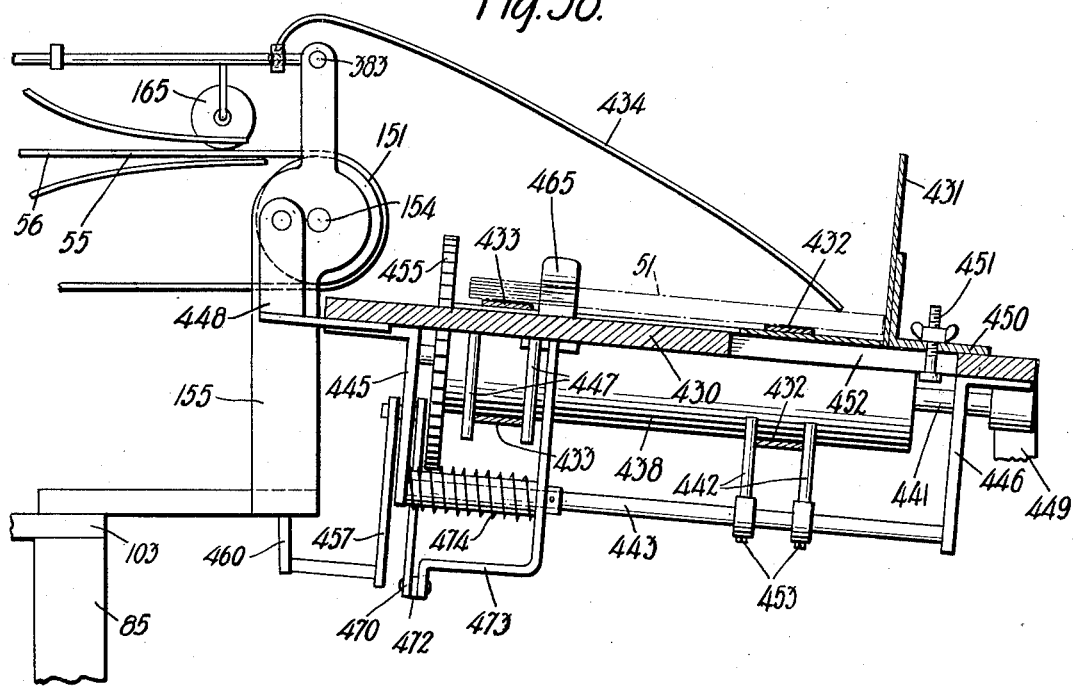
Figure 38 is a vertical front section taken on the line 38—38 of Figure 1 and shows the table for receiving the envelopes as they are fed from the conveyor belts.

The receiving device 72 upon which the envelopes are collected, includes a table 430, Figures 1 and 38 to which the envelopes pass from the conveyor belts 55 and 56. The table 430 is inclined and is provided with a vertical wall 431 secured thereto to assist in accumulating the envelopes in the corner formed by the table and the wall 431. They are carried step-by-step lengthwise of said table by two conveyor belts 432 and 433 which belts may be operated in a manner hereinafter described. As the envelopes pass along the table 430 they may be removed therefrom, at will, by the machine attendant. When they strike the wall 431 there is a tendency for them to rebound. This tendency may be overcome by a wire guard 434 which is pivotally supported between two collars 435 on a stationary shaft 436. The conveyor belts 432 and 433 are conducted over guide rollers 437 and 438 on shafts 440 and 441 respectively, said shafts being suitably supported on the table 430. The belt 432 may be guided by guide pins 442 (Figure 38) adjustably secured to a stationary bar 443 supported in brackets 445 and 446 secured to the table 430. The belt 433 may be guided by two stationary pins 447 secured to the table 430. The table may be supported by bracket members 448.

Provision is made to accommodate envelopes of various sizes on the receiving table 430. To this end the wall 431 is adjustable towards the belt 433 for narrower envelopes. To facilitate this adjustment, the wall 431 may be provided with a flange 450, Figure 38, which may be secured to the table 430 by a plurality of bolts 451 adjustable in slots 452 of said table. The belt 432 is also adjustable towards the other belt 433 for narrower envelopes. It is for this purpose that the belt guides 452 are adjustable along the bar 443; said guides being secured in their adjusted positions by screws 453. The guard or anti-rebound stop 434 is also adjustable according to the position of the walls 431. To this end the shaft 436 upon which the guard is pivotally mounted, is adjustable along a bar 454 (Figures 1 and 7) the bar 454 being adjustable along the rod 383 to locate said guard lengthwise of the envelope.

Figure 39:
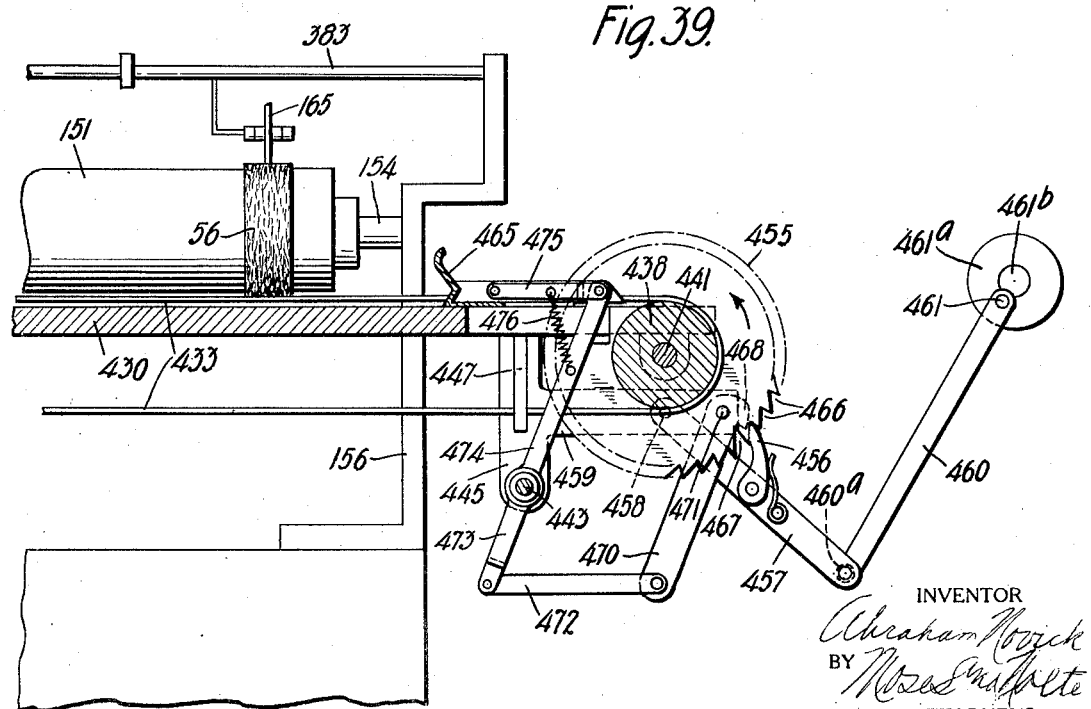
Figure 39 is a vertical section taken on the line 39—39 of Figure 1 and shows the means for separating the envelopes into separate packs of equal number so that the packs consisting of predetermined number of envelopes may readily be removed by the attendant of the machine.

To actuate the conveyor belts 432 and 433 and thus feed the envelopes along the receiving table 430 there may be secured to the shaft 451 (Figure 39) a ratchet wheel 455 which may be operated one tooth space at a time by a spring pressed pawl 456 carried by a lever 457 pivoted at 458 to an ear 459 of the bracket 445. A link 460 is connected with the lever 457 by a stud 460ª; the link 460 being connected with a crank pin 461 of a disc 461ª on a shaft 461ᵇ connected to the shaft 78 (Figure 1) of the press 60 in any suitable manner. Thus as the shaft 461ª rotates the lever 457 is oscillated and thus actuates the ratchet wheel 455 to feed the belts 432 and 433 with the envelopes thereon and thus cause them to be accumulated in overlapping relation on the receiving table 430.

To separate the envelopes into packs or groups of a definite number, say fifty, there may be provided a grouping element 465 which may be in the form of a slide supported at one end of the table 430 (Figures 1, 38 and 39) which is actuated at intervals to group the envelopes to thus provide a greater space between a group than there is provided between the individual envelopes of a group. This grouping of the envelopes facilitates their removal from the receiving board by the attendant, in packs of equal number.

To actuate the grouping element 465, the ratchet wheel may be provided with fifty teeth thus forming fifty notches, forty-nine shallow notches 466 and one deep notch 467. When the pawl enters the deep notch 467, it is enabled to engage a tooth 468 of a lever 470 to swing said lever about a pivot 471 to pull a link 472 and actuate a lever 473, supported on the bar 443 against the action of a return spring 476 (Figure 38). The grouping element 465 is connected to the upper end of the lever 474 by a link 475 so that said element may be reciprocated by the actuation of the lever 473. A spring 476 may be connected between the lever 473 and the link 475 to hold the grouping element 465 against the table 430 to slide thereon.

At that end of the table 430 towards which the envelopes are fed there is provided a guard 480 which curves upwardly from said table to prevent feeding of the envelopes from the table in case the operator's attention is distracted and he thus delays the removal of the envelopes.

The operation of the machine described in the foregoing will be, it is thought, clear, reference being had to the brief description thereof ante immediately preceding the more detailed description.

The form of the inventoin disclosed in Figures 40 to 46 inclusive will now be described. A feed roller 484 on the shaft 153 (Figures 45 and 46) co-operates directly with the roller 53 to feed the envelopes 51 from the hopper 52; the roller 484 being supported on the shaft 153 which is driven by the chain 121 co-operating with a sprocket 485 on the shaft 153. A gear 486 on the shaft 153 meshes with a gear 487 on the shaft 100 to drive the roller 53. It will be understood that the chain may be driven by the shaft 117 (Figure 6), and that the shaft 117 may be rotated in a clockwise direction by placing the gear 116 on the side of the gear 115 to the rear of the machine in order to rotate the roller 484 of Figure 46 in a clockwise direction. The pads 135 in the roller 53 may be adjusted by screws 488 to take up wear. Ends 490 of guide bars 491, hereinafter described, guide the leading edges of the envelopes between the rollers 53 and 150.

There are used instead of the forward conveyor belt 55, which it will be remembered, is depressed to provide clearance for the gripper 180 of the transfer mechanism 65, two belts 492 and 493; said belts being placed end to end to provide a space or depression 494 (Figure 41) in which the gripper 180 may operate. The belt 492 is supported at one end by a pulley 495 secured to the shaft 153, and at its other end by an idler 496 rotatably supported on a stud 497 secured to a bracket 498, which bracket is secured to a top plate 500 by a screw 501; the top plate being used instead of the bars 103 and 104 of Figure 7. The belt 493 is supported by the roller 151 at one end and at the other end by an idler 502 rotatively supported on a stud 503 secured to the bracket 498. The belt 492 is driven by the pulley 495. The belt 493 is driven by the roller 151, the latter being driven by the belt 56 which is driven by a pulley 504 secured to the shaft 153.

To assist the belts 56, 492 and 493 in feeding the envelopes there are provided guides 505, 506 and 507 respectively. Each guide is provided with a series of balls 508 (Figure 41) contained in apertures 510 formed in the bottom of the guide; the weight of said balls pressing the envelopes against the belts to insure the feed of the envlopes by them. The guides 505 and 506 may be secured to a bar 511 (Figures 40 and 45) by thumb screws or wing nuts 512 and 513 respectively, said bar being supported on posts 514 secured to the top-plate 500. The guide 507 is supported on a bar 515 secured to a post 516 secured to the top plate 500, said guide being secured to said bar by thumb screws or wing nuts 517.

To properly tension the belt 492 it is conducted under a roller 516 (Figures 41 and 45) supported on a rod 517 extending horizontally from a post 518. From said roller the belt is conducted over a tensioning roller 520 supported on an arm 521 adjustably secured to the rod 517. In a similar manner the belt 493 is conducted under a roller 522 (Figures 41 and 44) on a rod 523 secured to a post 524 on the top plate 500, and then over a tensioning roller 525 on an arm 526 adjustably secured to the rod 523. The belt 56 in Figures 40 and 41 is tensioned by a roller 527 mounted on a stud 528 secured to a post 531, secured to the top plate 500, and adjustable in a slot 530 of said post. The roller 527, in order to tension the belt 56 forms a kink 532 in it between the roller 151 and a guide roller 533 rotatably supported on a post 534 secured to the top plate 500.

Guide rollers 162, 163, 163ª, 163ᵇ and 165ª may co-operate with the belts 492, 493 and 56 (Figure 40) to assist in feeding the envelopes. An arm 535 mounted in any suitable manner, engages under the upper reach of the belt 56 to hold it in contact with the rollers 162ª and 163ᵇ. To keep the belt 493 from sagging when an envelope is conveyed thereby, there is provided a guide 536 located under the upper reach of the belt 493. Said guide has an arm 537 (Figure 44) by which it is supported, said arm being clamped between the guide 507 and the arm 515.

The bars 491 (Figure 40) are provided to serve as a table over which the envelopes slide while in transit. Said bars extend from the pulleys 495 and 504 at one side of the machine to the rollers 151 at the other side. They are supported on cross-bars 540 and 541 secured to posts 542 and 543 respectively on the top plate 500. Said bars may be secured to said cross-bars 540 and 541 by screws 544 and 545 respectively. Instead of a single bar at the front of the belts 492 and 493 (Figure 40) there are provided two sections 547 and 548 secured respectively to the cross-bars 540 and 541 by screws 550 and 551, the bars 547 and 548 being placed with their ends towards each other but with sufficient space between them to provide clearance for the bracket 498 and the gripper 180.

To provide clearance for the feeler 322, so as to enable it to move below the surface of the bars 491 to prevent the operation of the clasp attaching press 60 of Figure 1 in the absence of an envelope, each of the bars 491 is bent to form a depression 552 (Figures 40 and 41) into which the feeler 322 may move.

The transfer mechanism 65 of Figures 40 to 43 inclusive includes a slide 555 which is reciprocated in guide ways 556 secured to the top plate 500. A horn shaped bracket 557 is secured to the slide 555 by bolts 558. At the upper end of the bracket 557 is formed the lower jaw 560 of the gripper 65. The upper jaw 561 of the gripper is formed on a lever 562 pivoted on a stud 563 of the bracket; said upper jaw being operated to close the gripper to grasp the envelope upon the early part of the movement of the slide, rightwardly in Figure 42.

To operate the jaw lever 562 there is provided a spring 564 connected to pull a link 565 upwardly to actuate said lever 562 and close the gripper 180. The gripper is normally held open as in Figure 42 by a stationary cam 566 upon which rests a follower 567 of a lever 568 pivoted on a stud 570 on a bracket 571 extending from a base 572 of the arm 557. The link 565 connects the lever 568 with the lever 562 to thus hold the gripper open. When the slide 555 moves rightwardly from the position in Figure 42 the follower 567 rides down the incline of the cam 566 thus enabling the spring 565 to actuate the jaw 561 through the medium of the link 565. Further movement of the slide 555 transfers the gripped envelope to the fastener attaching press 60. Upon return stroke of the slide 555 the follower 567 rides up the incline of the cam 566 to operate the jaw 561 against the action of the spring 564 to open the gripper and release the envelope. The link 565 is adjustably connected with the lever 562 to vary its effective length between the levers 562 and 568 so as to procure the desired motion of the lever 562. The means to facilitate said adjustment may include a bolt 573 passing through a slot 574 in said link.

To actuate the gripper carrying slide 572 towards the clasp attaching device 60 there is provided a spring 575 connected at one end to a hook 576 on the slide and at its other end to a pin 577 secured to the top plate 500. To move the slide 572 in the opposite direction, or in other words, return it to normal, there is provided a cam 578 on the shaft 82. Said cam engages a follower 580 on a lever 581 to swing the latter about a fixed rod 582. The lever 581 extends upwardly through a slot 583 (Figures 40 and 43) in the top plate 500, and has connected to its upper end a link 584 connected to a lug 585 secured to the slide 555 by a bolt 586. Thus as the cam 578 rotates from the position in Figure 43 the slide 555 is returned by the cam 578, through the medium of the lever 581, against the action of the spring 575. When the depression 587 in the cam reaches the follower 586, the spring 575 again moves the slide rightwardly as previously described.

Provision is made to prevent the closed end of the envelope from catching on the belts 492 and 493 during its return from the press 60. To this end there are provided two deflecting fingers 590 which normally occupy an ineffective position as in Figure 42. Before the envelope is returned from the press these fingers are raised to bring inclined ends 591 into the path of the envelope and slightly above the upper reaches of the belts 492 and 493 so that the envelope is guided freely over said belts. The fingers 590 are again lowered by the time the envelope is fully returned from the press 60.

To actuate the fingers 590 there is secured to the shaft 82 a cam 592 which actuates a plunger 593, through the medium of a follower 594, and against the action of a spring 595. The plunger may be guided in the top plate 500 and by the shaft 82. It has secured to its upper end a bracket 596 from which extends a bar 597. The bar 597 carries a block 598 upon which is supported a shaft 600, and it is this shaft upon which the fingers 590 are supported by means of collars 601. Thus as the cam 592 rotates, the high portion 602 thereof lifts the plunger 593 to render the fingers 590 effective. When the portion 602 of the cam 592 passes out of engagement with the follower 594 the spring 591 lowers the plunger 593 and thus takes the fingers out of the path of the envelope.

The bars 547 and 548 are bevelled at 603 and 604 so as to prevent obstruction of the envelope when it returns from the press 60. The left hand end of the bar 548 is also bevelled at 605 to prevent obstruction to the envelope while being fed by the conveyor belts.

The aligning stops 57 and 58, in Figures 40, 41 and 42 are raised at the proper time by a cam 606 on the shaft 82. Said cam engages a follower 607 on a bell-crank 608 to swing the latter about the rod 582 to push upwardly on a link 610. The link 610 is connected by a block 611 to a plunger rod 612 extending upwardly through a vertical guide 613 secured to the top plate 500. To the upper end of the plunger rod 612 is secured a bar 614 upon which is mounted the aligning stop 58, the latter supporting a rod 615 which carries the other stop 57. To prevent rotation of the rod 612, so as to keep the stops 57 and 58 from swinging out of their positions, the rod 612 has secured thereto a pin 616 extending into a bifurcated bracket 617 secured under the top plate 500.

The stops 66 and 67 of Figure 41 are operated similarly to the stops 57 and 58. There is provided for this purpose a cam 620 co-operating with a bell-crank 621 to operate a plunger 622 which carries the bar 623 having supported thereon the stop 371. The stop 67 carries a bar 624 upon which the stop 370 is supported: It will be understood that by providing separate actuating mechanisms, including the cams 606 and 620, for the stops 57, 58 and 66, 67 the stops 57, 58 may be timed slightly different from the stops 66 and 67 if desired. The stop supporting rods 614, 615, 623 and 624 are non-circular or square in cross-section so as to keep the stops supported thereby from turning.

To accommodate various sizes of envelopes the mechanism illustrated in Figures 40 to 46 may be adjusted as follows: One or more of the bars 491 may be removed at the front of the machine nearest the belts 492 and 493, and said belts may be moved closer to the belt 56. To facilitate this adjustment of the belts 492 and 493, the screws 501 (Figures 40 and 41) of the bracket 498 which carries the idlers 496 and 502 which support said belts, are loosened. The bracket 498 is then pushed rearwardly to the desired position where it is secured by tightening the screws 501. One of the guide bars 556 and a guide bar 625 secured to the top plate 500 form a groove 626 in which the base 627 of said bracket engages to prevent turning of said bracket. The pulley 495 which supports the other end of the belt 492 and which may be secured to the shaft 153 by a set screw 628 is accordingly adjusted along said shaft 153. The rollers 516 which is held between the arm 521 and a collar 630 (Figure 45) is also adjusted along the rod 523 by changing the positions of said collar and arm. The rollers 522 and 525 are also adjustable laterally with the belt 493.

Adjustment of the guide 506, located above the belt 492, may be effected by loosening the nuts 513 and then pushing the guide along the bar 511. Similarly, adjustment of the guide 507 may be effected upon loosening the nuts 517. The feeler 322 may also be moved along the shaft 323 in accordance with the size of the envelope.

The same amount of motion is always required to transfer an envelope to the clasp attaching device 60 irrespective of the length of the envelope, and accordingly, with the slide actuating mechanism including the lever 581, the gripper carrying slide 555 starts from the same position and always travels to the same position. It is, however, necessary that the gripper 180 start from different positions according to the length of the envelopes. The slide 555 is therefore provided with a slot 631 through which pass the bolts 558 by which the gripper carrying arm 557 is secured to the slide. After loosening these bolts the position of the arm 557 may be changed on the slide to suit the length of the envelope. The bolts may then be tightened to secure the arm to said slide. Thus the normal or starting position of the gripper carrying arm 557 may be varied.

Provision is also made to adjust the gripper operating cam 566 in accordance with the position of the arm 557, the base 572 of which carries the gripper operating lever 568 which is actuable by the cam 566. To this end the cam 566 is secured to a bracket 632 which is secured to the top plate by a bolt 633 extending through a slot 634 in the top plate 500, said slot being elongated so that the bolt may be shifted with the bracket to the desired position. The bracket 632 is confined between one of the bars 556 and a short bar 635, secured to the top plate to be guided while being adjusted.

It will readily be understood that the aligning stops 57 and 370 may be adjusted along their respective supporting rods 615 and 624 according to the width of the envelope, and that the stops 57, 58 and 670, 671 may be adjusted lengthwise of the supporting rods 614 and 623 according to the width of the envelope.

In the form of the machine just described, it will be noted that I have provided additional supporting means between the belt conveyors in the form of the stationary bars 492, and that in lieu of having to depress one of the conveyor belts for the purpose of avoiding the path of the gripper advancing the envelope into the clasp attaching press 60, I have arranged such conveyor belt in tandem, thus allowing a space for the movement of the gripper. In order, however, to insure that the retracted envelope does not collide with the conveyor belts 162, 163, I have provided members (591) which are elevated at the proper moment to guide the edge of the envelopes over said belts. Furthermore, it will be noted that I have provided an improved means (505) for affording traction between the envelopes and the conveyor belts. In addition, certain features of the operating mechanism, such as the gripper 180, as well as the feeler mechanism (322) have been improved in design.

The operation of the form of machine last described is essentially similar to the first described form, and may be summarized as follows: Referring to Figure 40, the envelopes are fed out upon the conveyor bands, passing under the members 505, 506, Figures 40 and 41, together with rollers 162, 162ª, 163, 163ª which cause each envelope to bear against the conveyors 56, 492. The envelopes are successively conveyed by the belts until they reach the stops 57, 58 which are elevated into their line of travel, whereupon the rollers 162, 163, 163ª, 163ᵇ are elevated from contact therewith and the envelopes fed at right angles to their previous line of travel by means of the gripping mechanism 180, and into the press 60 which successively inserts a clasp in each envelope. Assisting this operation are the anti-buckling member 251 and the feeler 322 whose operations have already been described. After the clasp is inserted, the envelopes are retracted, the rollers 162, 163, 163ª, 163ᵇ depressed, and forward travel of the envelopes of the machine is resumed, aided by roller 165ª and bearing member 507 similar to members 505, 506, until the stops 66, 67 are reached, whereupon the prongs of the clasp are flattened out by means of the hammer mechanism 70. After this operation the envelopes are fed to the bunching and counting mechanism already described.

In the claims, the term "lengthwise of the envelope" will be understood to mean in the direction of its opening, i. e., at right angles to the crease of the sealing flap, regardless of the fact that for certain sized envelopes this may be the shorter dimension. Similarly, "transverse of the envelope body" will be understood to mean in a direction right angles to the direction of opening of the envelope.

What I claim is:

1. In a machine for securing a fastening device to envelopes and the like, a magazine for holding the envelopes, means for conveying, from the magazine, said envelopes with their sealing flaps extended and in a direction transverse to the envelope body and an anvil horn disposed in the path of travel of said envelopes so as to engage said extended sealing flaps.

2. In a machine for securing fastening devices to envelopes and the like, means for transporting envelopes from a point of supply to a point where an operation is to be performed upon them, arresting means in the path of movement of said envelopes and means for periodically interposing and retracting said arresting means.

3. In a machine for securing fastening devices to envelopes and the like, means for transporting or conveying envelopes from a point of supply to a point where an operation is to be performed upon them, said means comprising a conveyor loosely supporting said envelopes, arresting means in the path of movement of said envelopes and means for periodically interposing into operative position and retracting therefrom said arresting means.

4. In a machine for securing fastening devices to envelopes and the like, means for transporting or conveying envelopes from a point of supply to a station where a fastening device is to be inserted in the body of each envelope, means for successively arresting the advance of said envelopes, means for aligning them in their proper position and means for gripping said aligned envelopes and advancing them lengthwise into engaging means at said station.

5. In a machine as recited in claim 4, said aligning means including stops on said gripping means.

6. In a machine for securing fastening devices to envelopes and the like, means for conveying envelopes from a point of supply in a direction transverse to said envelopes to a point opposite a station where a fastening device is to be inserted in the body of each of said envelopes, means for arresting the advance of said envelopes, means for aligning said envelopes in their proper position, means for successively gripping said envelopes and advancing them in a lengthwise direction, the arrangement of the parts being such that said gripping means avoids said conveyor.

7. In a machine for securing fastening devices to envelopes and the like, means for transporting or conveying envelopes from a point of supply to a station where a fastening device is to be inserted in the body of each envelope, means for successively stopping the advance of said envelopes when said station is reached, means for moving said envelopes into said fastening device and means for preventing buckling of the envelopes during said movement thereof.

8. In a machine for performing an operation upon envelopes and the like, in combination, a conveyor comprising parallel, endless bands, means for pressing said envelopes against said bands to cause them to move therewith and means for releasing said pressure when the travel of said envelopes is to be arrested for performing an operation upon them.

9. In a machine for securing fastening devices to envelopes and the like, means for opening the mouth of an envelope comprising means for holding one side of the envelope near the mouth thereof against relative movement, means for applying pressure against the held side in a direction to open said envelope, the arrangement of parts being such that said envelope body is free to move relative to the held portion.

10. In a machine for securing fastening devices to envelopes and the like, means for opening the mouth of an envelope comprising means for holding the extended sealing flap of the envelope against relative movement and means for applying pressure against the side of the envelope forming a continuation of said sealing flap in a direction to open said envelope.

11. In a machine for securing fastening devices to envelopes and the like, means for positioning the envelope with its sealing flap in contact with an anvil horn, means for opening said envelope whereby said anvil horn may be inserted within the envelope comprising means for applying pressure against the side of the envelope forming a continuation of the sealing flap, in a direction to open same while holding said sealing flap against relative movement.

12. In a machine for securing fastening devices to envelopes and the like, means for positioning the envelope with its sealing flap against an anvil, means for opening said envelope whereby said anvil may be inserted within the envelope comprising means for applying pressure against the side of the envelope forming a continuation of the sealing flap in a direction to open same, and means for advancing said opened envelope so as to enter said anvil, and means for attaching said fastening device to the portion of the envelope body against said anvil.

13. In a machine for securing fastening devices to envelopes and the like, means for conveying envelopes to a first point at which fastening devices are inserted therein, means for conveying said envelope to a second point, means at said second point for flattening the prongs of said inserted devices.

14. In a machine for securing fastening devices to envelopes and the like, means for inserting said devices therein, means for flattening the prongs of said device comprising means for opening aid envelope, an anvil, means for moving said envelope and anvil relatively to one another whereby to cause said anvil to enter said envelope, a hammer, and means for causing said hammer to strike said fastening device so as to flatten the prongs thereof against said anvil.

15. In a machine for securing fastening devices to envelopes and the like, means for conveying said envelopes in a direction transverse to their length, means for stopping the movement of said envelope, means for advancing said envelope lengthwise into means for inserting said devices into said envelopes, means for retracting said envelopes and again advancing them, means for flattening the prongs of said fastened devices comprising means for arresting and aligning said envelopes and means operative to hammer said prongs without deflecting said envelopes from their line of travel.

16. In a machine for securing fastening devices to envelopes and the like, means for inserting such devices into said envelope, means for flattening the prongs of said devices, means for conveying said envelopes to said means last mentioned, said flattening means comprising a hammer and anvil, means for moving same into operative position, so as to include said fastening device, means for actuating said hammer to flatten said prongs and means for retracting said hammer and anvil out of the line of travel of said envelope.

17. In a machine for securing fastening devices to envelopes and the like, means for inserting said devices into said envelopes, means for conveying said envelopes to said means last mentioned, and means for preventing operation of said inserting means in case no envelope is presented, comprising a feeler moving into the path along which said envelopes are conveyed, the arrangement of parts being such that if no envelope is present, said feeler will exceed its normal travel and means actuated by such excess movement of the feeler to render such inserting means inoperative.

18. In a machine for performing an operation upon envelopes and the like, in combination, a conveyor for transporting said envelopes to a point where said operation is to be successively performed upon them, said conveyor comprising sections in tandem to thereby form a break in said conveyor, said break occurring at the point where said operation is to be performed.

19. In a machine for performing an operation upon envelopes and the like, in combination, a conveyor for transporting said envelopes to a point where said operation is to be successively performed upon them, said conveyor comprising sections in tandem to thereby form a break in said conveyor, said break occurring at the point where said operation is to be performed, means at said break for successively moving said envelopes at right angles to their previous direction of travel into engagement with means for performing said operation, means for retracting said envelopes and for allowing them to be further conveyed in said original direction.

20. In a machine for performing an operation upon envelopes and the like, in combination, a conveyor comprising parallel, endless bands, means between said bands supporting the envelopes during their travel through the machine, means for stopping the travel of said envelopes, means for advancing said envelopes at right angles to their previous line of travel, and means for preventing such transverse travel from being interfered with by said conveyor, comprising a guide member and means for moving same into operative position above said conveyor during a portion of said transverse travel.

21. In a machine for performing an operation upon envelopes and the like, in combination, a conveyor comprising parallel, endless bands, means between said bands supporting the envelopes during their travel through the machine in the form of a plurality of stationary bars lengthwise of the machine, means for stopping the travel of said envelopes, means for advancing said envelopes at right angles to their previous line of travel, and means for preventing such transverse travel from being interfered with by said conveyor, comprising a guide member and means for moving same into operative position above said conveyor during a portion of said transverse travel.

22. In a machine for securing fastening devices to envelopes and the like, means for inserting said devices into said envelopes, means for conveying said envelopes to said means last mentioned, and means for preventing operation of said inserting means in case no envelope is presented, comprising a feeler moving into the path along which said envelopes are conveyed, the arrangement of parts being such that if no envelope is present, said feeler will exceed its normal travel, means actuated by such excess movement of the feeler to render such inserting means inoperative, and means for supporting the envelopes during the travel thereof, including a stationary table, said table being formed with a pocket affording increased downward travel of said feeler in case no envelope is present.

23. In a machine for performing an operation upon envelopes and the like, in combination, an envelope feeding device, a station at which an operation is to be performed upon said envelopes, a conveyor positioned to receive envelopes fed thereon from said feeding means and adapted to convey them to said station, said conveyor comprising parallel endless bands, and means affording traction between said bands and said envelopes comprising a plurality of rolling surfaces adapted to bear against said envelopes.

24. In a machine for performing an operation upon envelopes and the like, in combination, an envelope feeding device, a station at which an operation is to be performed upon said envelopes, a conveyor positioned to receive envelopes fed thereon from said feeding means and adapted to convey them to said station, said conveyor comprising parallel endless bands, and means affording traction between said bands and said envelopes comprising a plurality of balls adapted to contact with said envelopes and bearings for said balls.

In testimony whereof I have affixed my signature to this specification.

ABRAHAM NOVICK.